US 6,565,212 B2

(12) United States Patent
Kobayashi et al.

(10) Patent No.: US 6,565,212 B2
(45) Date of Patent: May 20, 2003

(54) PROJECTION DISPLAY APPARATUS, AND INFORMATION PROCESSING SYSTEM AND IMAGE RECORDING/REPRODUCING SYSTEM USING THE SAME

(75) Inventors: Shuichi Kobayashi, Yokohama (JP); Takehiko Nakai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/783,659

(22) Filed: Feb. 14, 2001

(65) Prior Publication Data
US 2001/0024267 A1 Sep. 27, 2001

(30) Foreign Application Priority Data
Feb. 16, 2000 (JP) .......................... 2000-037911

(51) Int. Cl.[7] .................. G03B 21/00; G03B 21/26; G03B 21/28; G02F 1/1335; G02B 27/42
(52) U.S. Cl. .................. 353/31; 353/34; 353/37; 349/8; 349/18; 359/558
(58) Field of Search ................. 353/31, 33, 34, 353/37, 81; 349/5, 7, 8, 18; 359/558

(56) References Cited

U.S. PATENT DOCUMENTS

| 4,150,396 A | * | 4/1979 | Hareng et al. ............ 348/751 |
| 5,400,095 A | * | 3/1995 | Minich et al. ............ 353/119 |
| 6,034,819 A | * | 3/2000 | Ogata .................. 359/565 |
| 6,273,568 B1 | * | 8/2001 | Okuyama ................ 353/31 |

* cited by examiner

Primary Examiner—David M. Gray
Assistant Examiner—Magda Cruz
(74) Attorney, Agent, or Firm—Morgan & Finnegan, L.L.P.

(57) ABSTRACT

In a projection display apparatus, light from a light source is separated into a plurality of beams having different wavelength regions, a plurality of image display elements (123r, 123g, 123b) are inserted in the optical paths of the respective separated beams so as to be illuminated by the beams. A color combiner (XDP) is provided for combining the beams emerging from the plurality of image display elements. The beams combined by the color combiner are projected on a projection surface. A diffraction optical element (124) is inserted in at least one of a plurality of optical paths between the plurality of image display elements and the color combiner.

18 Claims, 30 Drawing Sheets

FIG. 4

OBJECT DISTANCE -2520

| | W | T |
|---|---|---|
| FOCAL LENGTH | 47.8 | 61 |
| Fno | 1.85 | 2.14 |

| INTERVAL OF UNITS | W | T |
|---|---|---|
| d8 | 12.9 | 3.04 |
| d13 | 18.75 | 30.95 |
| d16 | 12.54 | 4.66 |
| d21 | 0.9 | 6.43 |

VARIABLE BY FOCUSING (UPON OBJECT DISTANCE OF 2520mm)

| UNIT NO. | SURFACE NO. | RADIUS OF CURVATURE | INTERVAL | REFRACTIVE INDEX | ABBE CONSTANT |
|---|---|---|---|---|---|
| G1 | 1 | 136.499 | 8.26 | 1.658 | 50.9 |
| | 2 | -528.723 | 0.25 | | |
| | 3 | 112.305 | 3.5 | 1.516 | 64.1 |
| | 4 | 35.963 | 14.23 | | |
| | 5 | -62.43 | 2.4 | 1.516 | 64.1 |
| | 6 | 55.217 | 9.58 | | |
| | 7 | 80.167 | 4.61 | 1.772 | 49.6 |
| | 8 | 213.644 | VARIABLE | | |
| G2 | 9 | 107.755 | 5.93 | 1.806 | 40.9 |
| | 10 | -143.343 | 12.35 | | |
| | 11 | 170.053 | 7.3 | 1.772 | 49.6 |
| | 12 | -54.739 | 1.8 | 1.847 | 23.8 |
| | 13 | -360.975 | VARIABLE | | |
| G3 | 14 | -51.722 | 1.5 | 1.487 | 70.2 |
| | 15 | 67.099 | 3.3 | 1.569 | 56.4 |
| | 16 | 83.902 | VARIABLE | | |
| G4 | 17 | -145.526 | 12 | 1.697 | 55.5 |
| | 18 | -29.444 | 2.6 | 1.847 | 23.8 |
| | 19 | -55.618 | 0.25 | | |
| | 20 | 701.068 | 7.01 | 1.697 | 55.5 |
| | 21 | -113.769 | VARIABLE | | |
| G5 | 22 | 79.783 | 8.51 | 1.658 | 50.9 |
| | 23 | 2314.27 | 9.9 | | |
| XDP FOR RED | 24 | inf | 45 | 1.516 | 64.1 |
| XDP FOR GREEN LIGHT | 25 | inf | 11.65 | | |
| | 26 | | | | |
| | 27 | | | | |
| XDP 124 FOR BLUE LIGHT | 24 | inf | 45 | 1.516 | 64.1 |
| | 25 | inf | 1 | | |
| | 26 | inf | 1 | 1.51633 | 64.1 |
| | 27 | inf | 9.65 | | |

DIFFRACTION OPTICAL ELEMENT (SURFACE NO. 27 ON OPTICAL PATH OF BLUE LIGHT)

| | c1 | c2 | c3 | c4 | c5 | c6 |
|---|---|---|---|---|---|---|
| PHASE FUNCTION | -0.00176 | 1.63E-05 | -7.55E-08 | 1.18E-10 | 2.29E-13 | 1.13E-16 |
| DESIGN WAVELENGTH | 550nm | | | | | |
| DESIGN ORDER | 1 | | | | | |

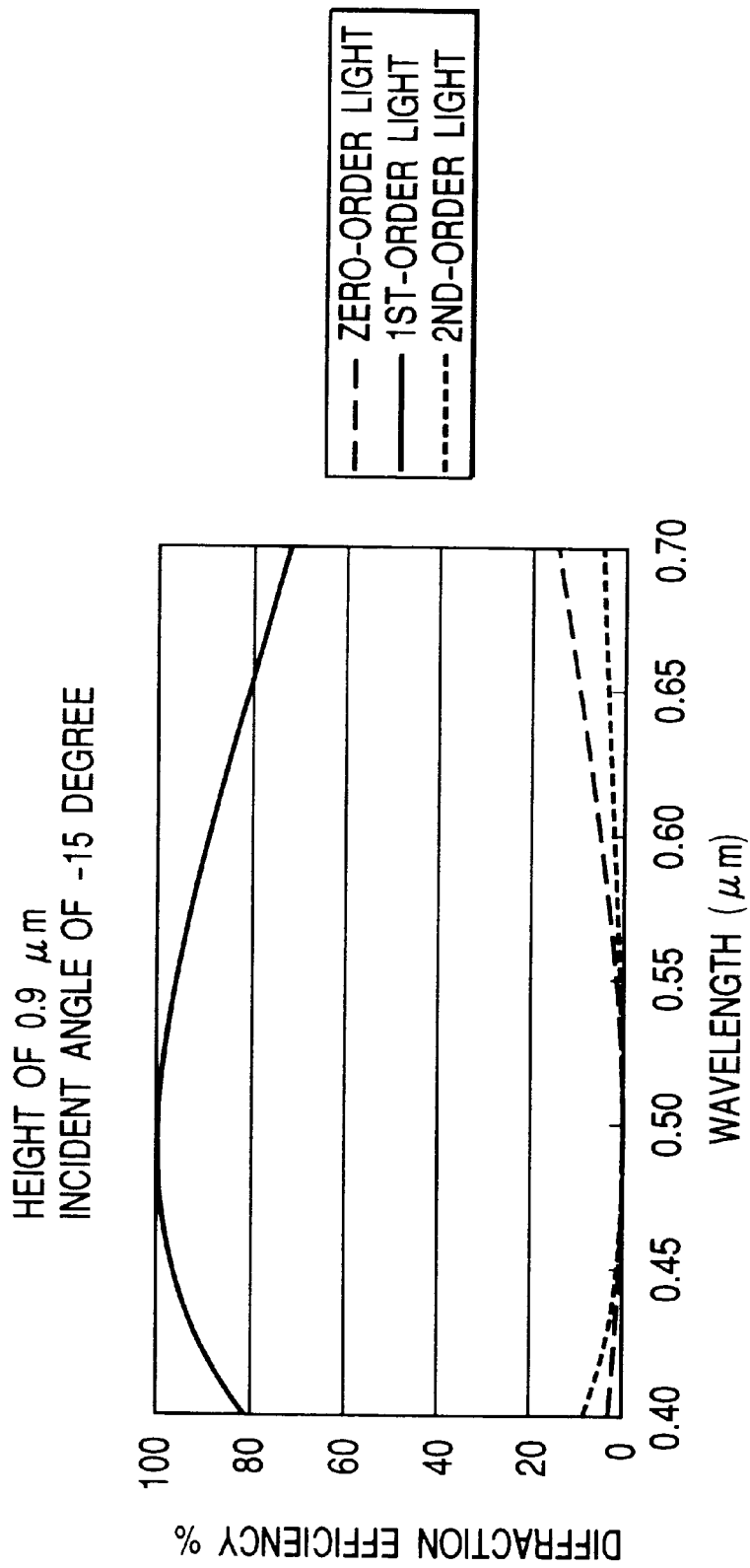

FIG. 12

|  | W | T |
|---|---|---|
| FOCAL LENGTH | 47.8 | 61.3 |
| Fno | 1.85 | 2.16 |

OBJECT DISTANCE   -2520

| UNIT NO. | SURFACE NO. | RADIUS OF CURVATURE | INTERVAL | REFRACTIVE INDEX | ABBE CONSTANT |
|---|---|---|---|---|---|
| G1 | 1 | 248.77 | 6.71 | 1.658 | 50.9 |
|  | 2 | -243.863 | 0.25 |  |  |
|  | 3 | 140.127 | 3.5 | 1.516 | 64.1 |
|  | 4 | 45.11 | 14.23 |  |  |
|  | 5 | -64.731 | 2.4 | 1.516 | 64.1 |
|  | 6 | 51.235 | 9.58 |  |  |
|  | 7 | 98.352 | 6.32 | 1.786 | 44.2 |
|  | 8 | 1307.44 | VARIABLE |  |  |
| G2 | 9 | 65.411 | 9.37 | 1.603 | 60.6 |
|  | 10 | -166.147 | 12.35 |  |  |
|  | 11 | 125.961 | 5.99 | 1.72 | 50.2 |
|  | 12 | -60.411 | 1.8 | 1.762 | 26.5 |
|  | 13 | -423.279 | VARIABLE |  |  |
| G3 | 14 | -42.191 | 1.5 | 1.548 | 45.8 |
|  | 15 | 69.99 | VARIABLE |  |  |
|  | 16 | -169.733 | 13.15 | 1.658 | 50.9 |
| G4 | 17 | -29.987 | 2.4 | 1.762 | 26.5 |
|  | 18 | -60.256 | 0.25 |  |  |
|  | 19 | -681.929 | 6.27 | 1.697 | 55.5 |
|  | 20 | -97.306 | VARIABLE |  |  |
| G5 | 21 | 83.326 | 8.38 | 1.744 | 44.8 |
|  | 22 | -416.614 | 8.35 |  |  |
| XDP | 23 | inf | 45 | 1.516 | 64.1 |
|  | 24 | inf | 1 |  |  |
| 204 | 25 | inf | 2 | 1.516 | 64.1 |
|  | 26 | inf (DIFFRACTION SURFACE (BACK FOCUS)) |  |  |  |

| INTERVAL OF UNITS | W | T |
|---|---|---|
| d8 | 20.234 | 4.6 |
| d13 | 18.66 | 25.48 |
| d15 | 8.9 | 7.29 |
| d20 | 0.9 | 11.32 |
| d26 | 8.65 | 8.65 |

VARIABLE BY FOCUSING
(UPON OBJECT DISTANCE OF 2520mm)

(BACK FOCUS)

DIFFRACTION OPTICAL ELEMENT (S26)

|  | c1 | c2 | c3 | c4 | c5 |
|---|---|---|---|---|---|
| PHASE FUNCTION | -1.12E-03 | 3.05E-06 | -9.78E-09 | 1.42E-11 | -7.67E-15 |
| DESIGN WAVELENGTH | 550 | | | | |
| DESIGN ORDER | 1 | | | | |

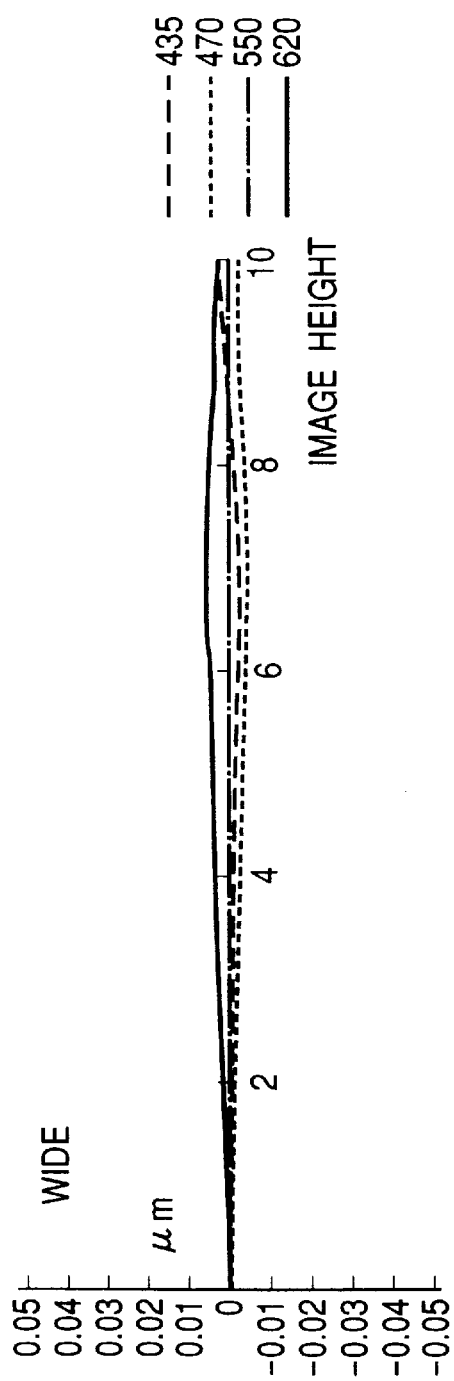
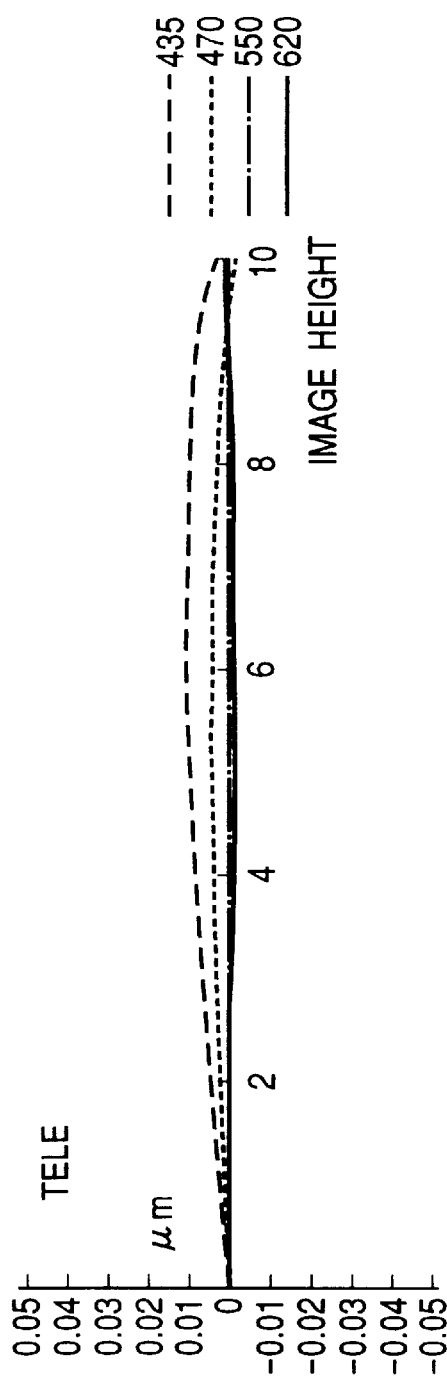
FIG. 15A
FIG. 15B

FIG. 19

| | W | T |
|---|---|---|
| FOCAL LENGTH | 47.7 | 61.1 |
| Fno | 1.85 | 2.16 |

OBJECT DISTANCE −2520

| UNIT NO. | SURFACE NO. | RADIUS OF CURVATURE | INTERVAL | REFRACTIVE INDEX | ABBE CONSTANT |
|---|---|---|---|---|---|
| G1 | 1 | 256.091 | 7.18 | 1.658 | 50.9 |
| | 2 | −180.789 | 0.25 | | |
| | 3 | 231.851 | 3.5 | 1.516 | 64.1 |
| | 4 | 43.461 | 14.23 | | |
| | 5 | −51.674 | 2.4 | 1.516 | 64.1 |
| | 6 | 51.953 | 6.92 | | |
| | 7 | 100.53 | 5.48 | 1.772 | 49.6 |
| | 8 | −318.779 | VARIABLE | | |
| G2 | 9 | 56.968 | 8.6 | 1.569 | 56.4 |
| | 10 | −205.101 | 12.3 | | |
| | 11 | 158.079 | 6.08 | 1.72 | 50.2 |
| | 12 | −54.386 | 1.8 | 1.805 | 25.4 |
| | 13 | −185.241 | VARIABLE | | |
| G3 | 14 | −37.364 | 1.5 | 1.699 | 30.1 |
| | 15 | 100.069 | VARIABLE | | |
| G4 | 16 | −114.166 | 7.48 | 1.72 | 50.2 |
| | 17 | −60.156 | 0.25 | | |
| | 18 | −2671.95 | 5.73 | 1.772 | 49.6 |
| | 19 | −78.629 | VARIABLE | | |
| G5 | 20 | 77.83 | 7.86 | 1.658 | 50.9 |
| | 21 | −322.202 | 8.35 | | |
| XDP | 22 | inf | 45 | 1.516 | 64.1 |
| | 23 | inf | 1 | | |
| 304 | 24 | inf | 2 | 1.516 | 64.1 |
| | 25 | inf (DIFFRACTION SURFACE (BACK FOCUS)) | | | |

| INTERVAL OF UNITS | W | T |
|---|---|---|
| d8 | 20.237 | 4.09 |
| d13 | 19.26 | 26.63 |
| d15 | 7.46 | 7.19 |
| d19 | 0.9 | 10.53 |
| d25 | 8.65 | 8.65 |

VARIABLE BY FOCUSING
(UPON OBJECT DISTANCE OF 2520mm)

(BACK FOCUS)

| DIFFRACTION OPTICAL ELEMENT | | | | | |
|---|---|---|---|---|---|
| | c1 | c2 | c3 | c4 | c5 |
| PHASE FUNCTION | −1.58E−03 | 3.83E−06 | −1.03E−08 | 1.41E−11 | −7.32E−15 |
| DESIGN WAVELENGTH | 550 | | | | |
| DESIGN ORDER | 1 | | | | |

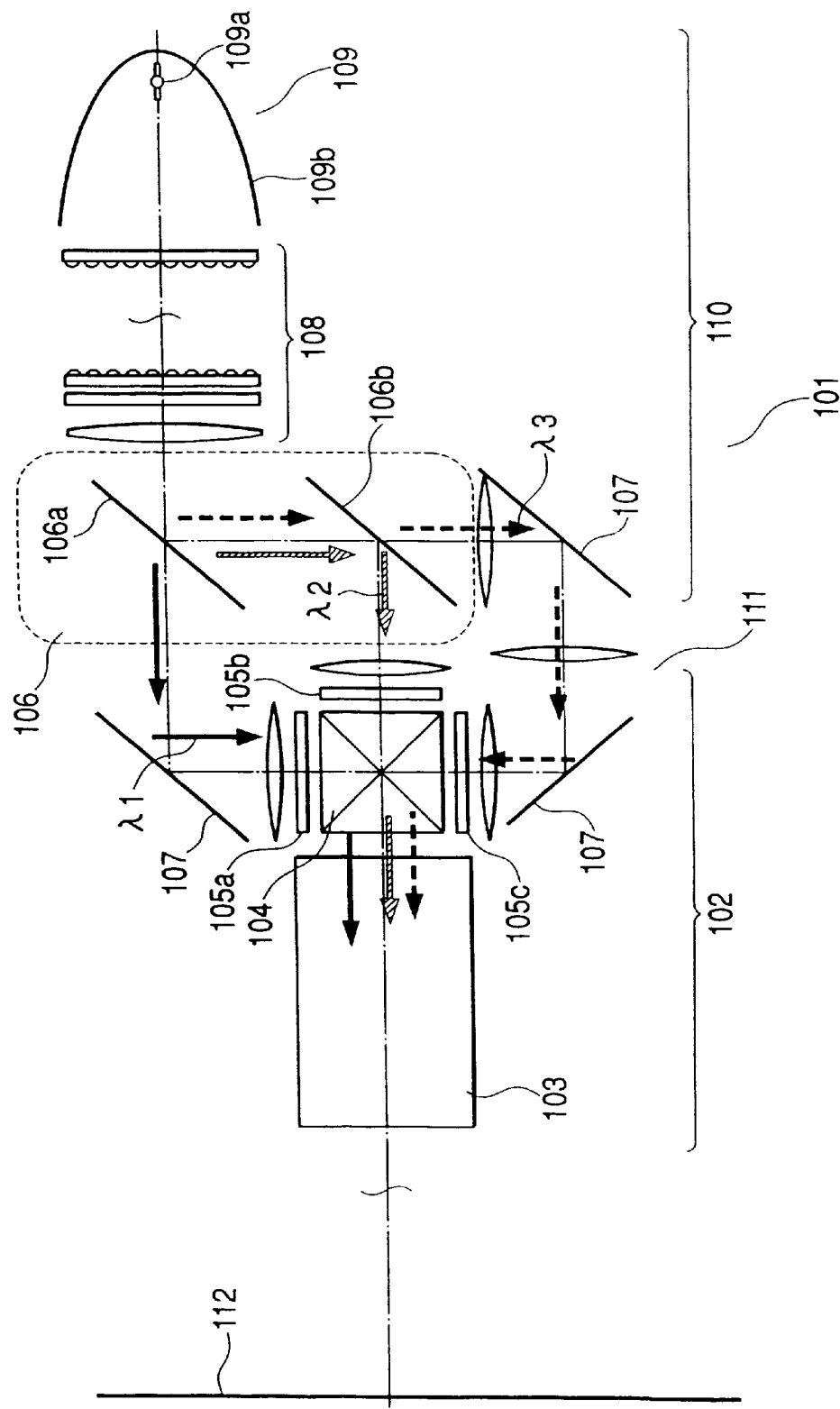
FIG. 24 - PRIOR ART -

FIG. 25A  - PRIOR ART -
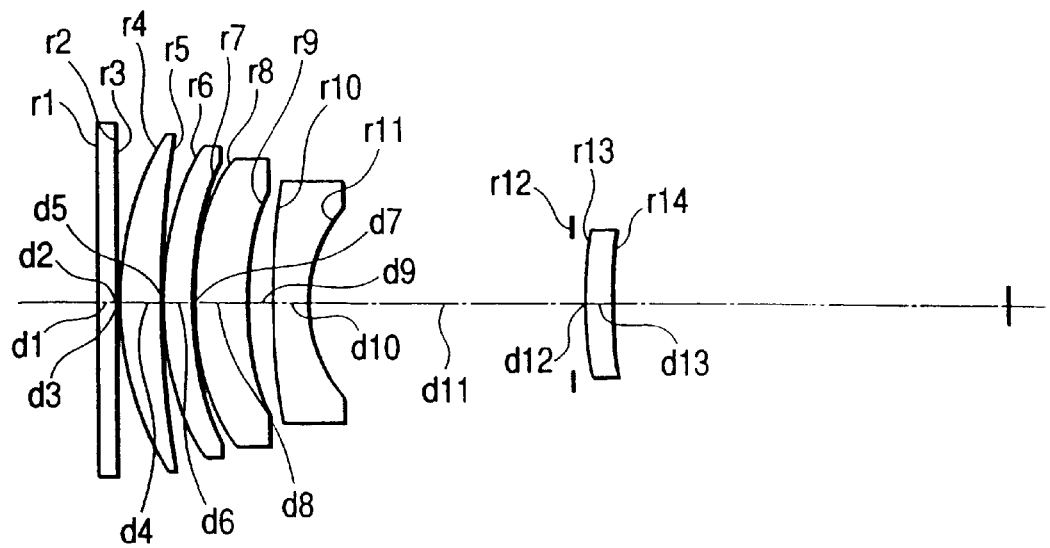
FIG. 25B  - PRIOR ART -
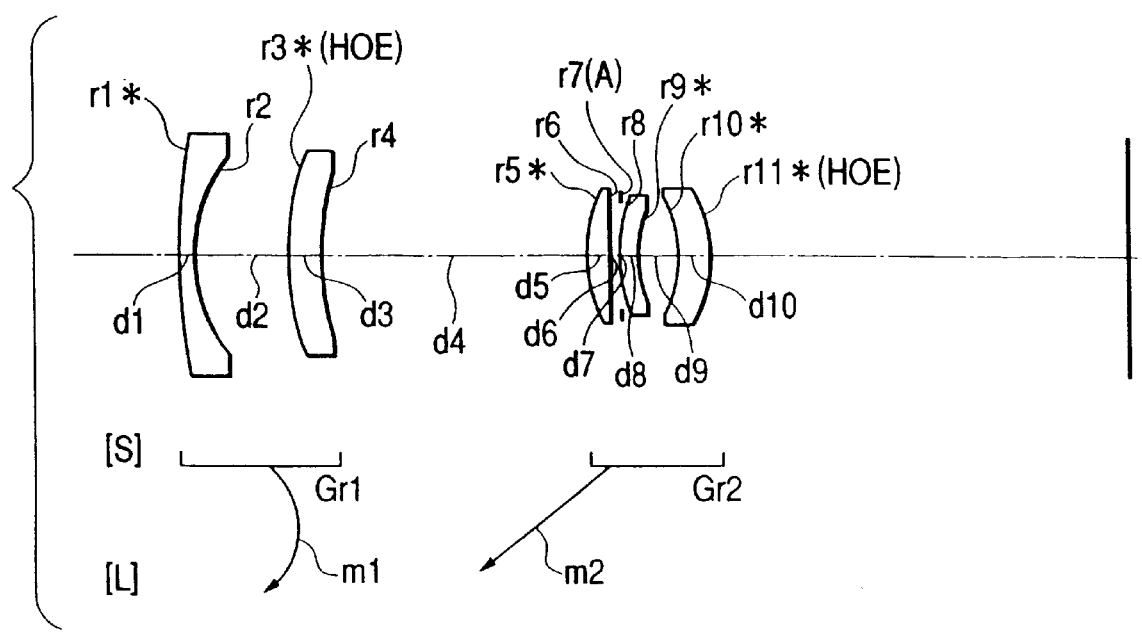

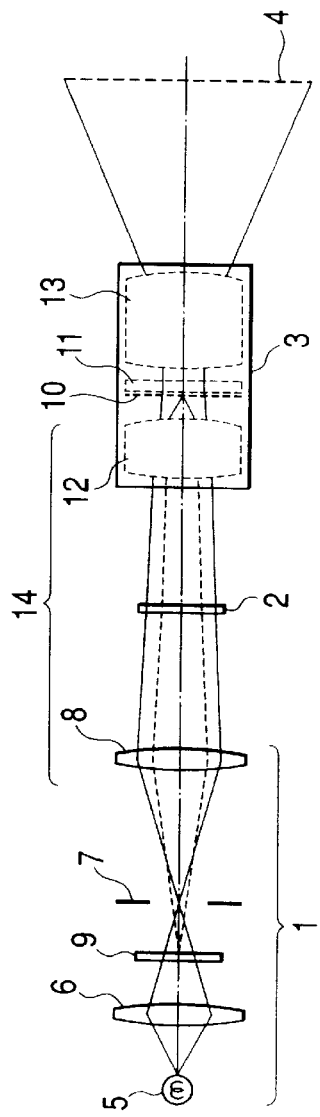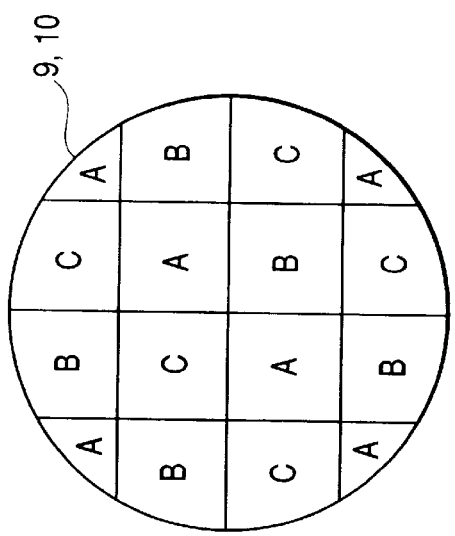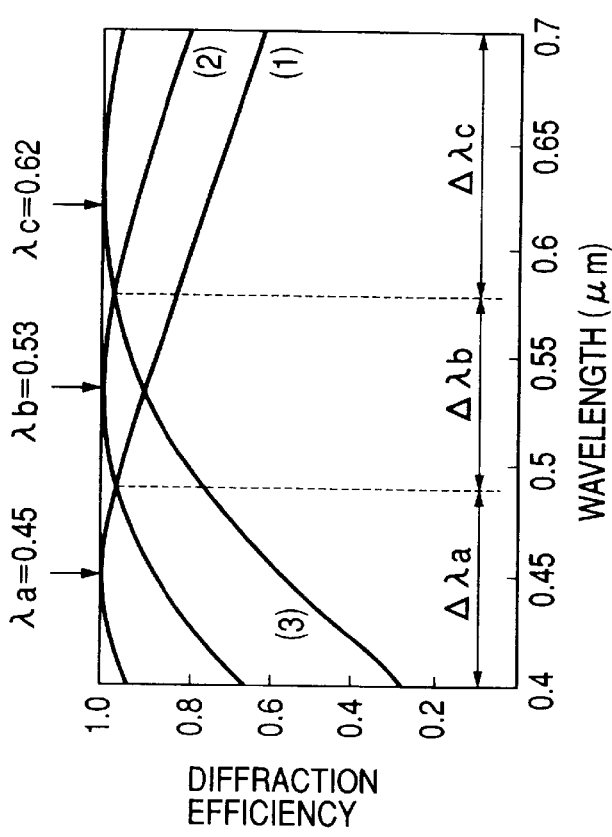
FIG. 27A
FIG. 27C
FIG. 27B

PROJECTION DISPLAY APPARATUS, AND INFORMATION PROCESSING SYSTEM AND IMAGE RECORDING/REPRODUCING SYSTEM USING THE SAME

BACKGROUND OF THE INVENTION

1. Field of the Invention

The present invention relates to a projection display apparatus, and an information processing system and image recording/reproducing system using the same and, more particularly, to a so-called multiple-plate type projection display apparatus using a plurality of image display elements.

2. Related Background Art

Attention has recently been paid to a projection display apparatus for enlarging and projecting a display image on the image display element of a liquid crystal panel or the like. Along with this trend, demands have arisen for further improvements in the image quality and brightness of the display image and reduction in the size and weight of the whole apparatus.

Projection display apparatuses are classified into a single-panel type apparatus using one liquid crystal panel and a multiple-panel type apparatus using a plurality of liquid crystal panels. Many projection display apparatuses aiming high image quality use three panels corresponding to red, green, and blue light components. A projection display apparatus using multiple, e.g., three liquid crystal panels will be described.

The arrangement of a general multiple-plate type projection display apparatus will be described with reference to FIG. 24. FIG. 24 shows an overview of an optical system 101 in the projection display apparatus. The optical system 101 of the projection display apparatus is mainly constituted by an illumination optical system 110 and projection optical system 102. An image display element 105 (105a to 105c) made up of liquid crystal panels or the like is illuminated by the illumination optical system 110, and an image on the illuminated image display element 105 is formed on a screen 112 via the projection optical system 102.

In the illumination optical system 110, the image display element 105 is made up of the three, first, second, and third liquid crystal panels 105a, 105b, and 105c. These liquid crystal panels 105a, 105b, and 105c are transmission panels which are driven by an electric circuit (not shown) to display images to be projected.

The optical path and optical elements from the illumination optical system 110 to the screen 112 will be explained. In the illumination optical system 110, a light source section 109 has a light source 109a for emitting white light, and a reflector 109b for collimating a ray from the light source 109a. An integrator section 108 increases the uniformity of illumination light, and is a fly-eye integrator in this case. The integrator section 108 sometimes comprises, e.g., a polarization conversion element for increasing the use efficiency of illumination light.

In the illumination optical system 110, a color separation system 106 separates the optical path of white light from the light source 109a in units of wavelength regions, i.e., colors. For descriptive convenience, the color separation system 106 separates white light from the light source 109a into three representative wavelengths $\lambda 1$, $\lambda 2$, and $\lambda 3$. In practice, the respective optical paths correspond to red, green, and blue colors which respectively include the wavelengths $\lambda 1$, $\lambda 2$, and $\lambda 3$ which respectively indicate the center of wavelength of the transmitting light or at which the respective transmittances become maximum.

In the color separation system 106, a first dichroic mirror 106a has a function of transmitting only a light component with the wavelength $\lambda 1$ out of white light from the light source 109a, and reflecting light components with the wavelengths $\lambda 2$ and $\lambda 3$. The light component with the wavelength $\lambda 1$ having passed through the first dichroic mirror 106a is deflected by a deflection means 107 to illuminate the first liquid crystal panel 105a via a lens. The light components with the wavelengths $\lambda 2$ and $\lambda 3$ reflected by the first dichroic mirror 106a are incident on a second dichroic mirror 106b.

The second dichroic mirror 106b reflects the light component with the wavelength $\lambda 2$, and transmits the light component with the wavelength $\lambda 3$. The light component with the wavelength $\lambda 2$ reflected by the second dichroic mirror 106b illuminates the second liquid crystal panel 105b via a lens. The light component with the wavelength $\lambda 3$ having passed through the second dichroic mirror 106b illuminates the third liquid crystal panel 105c via the deflection means 107 and a relay system 111 including a plurality of lenses.

The projection optical system 102 comprises a cross prism (cross dichroic prism) 104 for color combination. The above-described transmission liquid crystal panels 105a to 105c are arranged near respective incident surfaces of the cross prism 104. With this arrangement, the projection optical system 102 combines the optical paths of the light components with the wavelengths $\lambda 1$, $\lambda 2$, and $\lambda 3$. A projection lens 103 is arranged near the exit surface of the cross prism 104. Images on the illuminated liquid crystal panels 105a, 105b, and 105c are projected on the screen 112 so as to overlap each other.

In the projection display apparatus having this arrangement, the illumination light components of the first, second, and third liquid crystal panels 105a, 105b, and 105c are combined as an image by the cross prism 104, projected via the projection lens 103, and displayed on the screen 112 so as to overlap each other. In the projection display apparatus, therefore, pixels constituting the liquid crystal panels 105a to 105c must overlap each other, and aberrations of the optical system 101, particularly chromatic aberration of magnification of the projection optical system 102 needs to be further reduced.

As for reduction in chromatic aberration, techniques of greatly reducing chromatic aberration by arranging a diffraction optical element in a refraction optical system are conventionally disclosed in Japanese Patent Application Laid-Open No. 06-194509 "Optical System Including Diffraction Optical Element, and Diffraction Optical Element", Japanese Patent Application Laid-Open No. 08-043767 "Image Sensing Optical System", Japanese Patent Application Laid-Open No. 10-213744, and the like.

FIGS. 25A and 25B show the sections of optical systems disclosed in Japanese Patent Application Laid-Open Nos. 08-043767 and 10-213744, respectively. FIG. 25A shows an image sensing optical system for a telescope lens or the like. A surface r3 of a parallel plate located closest to the object side is formed as the formation surface of a diffraction optical element to greatly reduce chromatic aberration without using any low or extra-low dispersion glass.

As shown in FIG. 25B, Japanese Patent Application Laid-Open No. 10-213744 discloses an optical system for a finite-distance zoom lens made up of a lens unit GR1 having negative and positive meniscus lenses, and a lens unit GR2 having a biconvex positive lens, stop (A), and negative and positive meniscus lenses. Diffraction optical elements are formed on surfaces (HOE) in FIG. 25B, i.e., a convex surface r3* of the positive meniscus lens of the lens unit GR1 and a convex surface r11* of the positive meniscus lens of the lens unit GR2. This realizes a small number of lenses in the lens units GR1 and GR2, a small-size zoom lens, and high performance.

Reduction in chromatic aberration is achieved in this case because the diffraction optical element has characteristics opposite to the dispersion of an optical glass having vd=about −3.453 in Abbe constant, and has high dispersion characteristics. The diffraction optical element is very thin because the grating structure exhibits these characteristics, and can downsize the optical system.

The diffraction optical element has these properties, can greatly improve optical performance, but must consider parasitic-diffracted light (stray light) generated by diffraction.

Parasitic-diffracted light (stray light) and diffraction will be explained by exemplifying a case wherein the incident angle to a diffraction grating is 0°, as shown in FIG. 26. Letting P be the grating interval of a diffraction grating, $\lambda$ be the wavelength, and m be the diffraction order, an angle e at which mth-order diffracted light is deflected satisfies $$m \cdot \lambda = p \sin \theta \qquad (1)$$

When the diffraction efficiency is designed to be 100% at a wavelength $\lambda o$, the diffraction efficiency $\eta_m$ for light having the wavelength $\lambda$ and mth-order is given by $$\eta_m = \sin c^2(\lambda o/\lambda - m) \qquad (2)$$

From equation (2), the diffraction efficiency depends on the wavelength. For example, for $\lambda = \lambda o$ and m=1 in equation (2), the diffraction efficiency is 100%. At other wavelengths, however, the diffraction efficiency for m=1 does not become 100%, and parasitic-diffracted light (stray light) is generated.

Characteristic (2) shown in FIG. 27B shows the wavelength dependence of the diffraction efficiency when the wavelength reaches 530 nm at the peak of the diffraction efficiency of a design order. As is apparent from FIG. 27B, the diffraction efficiency is 100% around a wavelength of 530 nm at the peak of the designed order, but greatly decreases at 400 nm or 700 nm.

The decrease in diffraction efficiency at the design order acts as parasitic-diffracted light (stray light), and the light is diffracted in a different direction from the design order in accordance with equation (1). For this reason, the prior art suffers image degradation caused by parasitic-diffracted light (stray light) in picking up an image with a light source having a wide wavelength region such as a visible light region having a high luminance.

As for a wavelength at which the diffraction efficiency maximizes, when the design order is the 1st order, the design wavelength is $\lambda o$, d represents the grating height of the diffraction optical element, No represents the refractive index of the structure of the diffraction optical element having the wavelength $\lambda o$, and the refractive index of air is 1, as shown in FIG. 26, and:

$$\lambda o = d(No - 1) \qquad (3)$$

holds, the diffraction efficiency for the wavelength $\lambda o$ is 100%. At wavelengths other than $\lambda o$, equation (3) does not hold, and the wavelength dependence of the diffraction efficiency appears.

Japanese Patent Application Laid-Open No. 08-220482 discloses a technique of reducing image degradation caused by parasitic-diffracted light (stray light) of the diffraction optical element used in a wide wavelength region like a visible light region or a plurality of wavelength regions. This technique will be described with reference to FIGS. 27A to 27C.

FIG. 27A shows the schematic section of an optical system. This optical system illuminates an object 2 by an illumination optical system 1, and forms the image on an image plane 4 via a projection optical system 3. The illumination optical system 1 for illuminating the object 2 comprises, e.g., a light source 5 for emitting visible white light, collector lens 6, aperture stop 7, condenser lens 8, and segmented wavelength selection element 9. The projection optical system 3 for projecting the image of the object 2 comprises lens units 12 and 13, and a diffraction optical element 11 having a relief pattern surface 10 on which a concentric relief pattern is formed.

The diffraction optical element 11 is on the pupil of the projection optical system 3, and the relief pattern surface 10 is divided into regions, as shown in FIG. 27C. Regions A, B, and C of the diffraction optical element 11 in FIG. 27C have diffraction efficiencies corresponding to characteristics (1), (2) and (3) in FIG. 27B, respectively. With this setting, uniform diffraction efficiencies can be obtained in the entire region of the diffraction grating 10.

In this optical system, assume that, e.g., the diffraction efficiency of region C corresponds to characteristic (3) in FIG. 27B. Since the diffraction efficiency around 400 nm is very low, light in a wide wavelength region incident on the entire region on the pupil generates parasitic-diffracted light (stray light).

One of methods of reducing the wavelength dependence of the diffraction efficiency of the diffraction optical element is a technique disclosed in Japanese Patent Application Laid-Open No. 09-127321. FIG. 28 shows its schematic structure. A diffraction grating having a plurality of stacked optical materials is constituted as shown in FIG. 28, thereby reducing the wavelength dependence of the diffraction efficiency. In this case, however, the grating structure is complicated.

SUMMARY OF THE INVENTION

The present invention has been made to overcome the conventional drawbacks, and has as its object to provide a projection display apparatus having a projection optical system which achieves high performance and small size and reduces parasitic-diffracted light (stray light) even with the use of a diffraction optical element having a simple arrangement, and an information processing system and image recording/reproducing system using the projection display apparatus.

To achieve the above object, according to one aspect of the present invention, there is provided a projection display apparatus comprising color separation means for separating light from a light source into a plurality of beams having different wavelength regions, a plurality of image display elements each inserted in each of optical paths of the beams separated by the color separation means so as to be illuminated by the beams, color combining means for combining the beams emerging from the plurality of image display elements, and projection means for projecting the beams combined by the color combining means on a projection surface, wherein a diffraction optical element for reducing chromatic aberration of magnification of the projection means is inserted in at least one of a plurality of optical paths between the plurality of image display elements and the color combining means.

The diffraction optical element is very thin, and is hardly spatially limited. Arranging the diffraction optical element in the optical system can greatly reduce aberrations, particularly chromatic aberration of magnification while decreasing the number of lenses.

The diffraction optical element, which is inserted in the optical path after color separation, can individually correct aberrations within only a given spectral region to remarkably improve the imaging performance. By limiting aberration correction to a given spectral region, parasitic-diffracted light (stray light) can be reduced.

In the projection display apparatus, letting λc be a central wavelength of a wavelength region of a beam illuminating an image display element on an optical path in which the diffraction optical element is inserted, or a wavelength having the highest luminous intensity in the wavelength region, and λi be a wavelength having the highest diffraction efficiency of the diffraction optical element, the wavelengths λc and λi satisfy $$0.0 < ABS((\lambda i - \lambda c)/\lambda c) < 0.14$$

where ABS represents the absolute value of a numerical value within the parentheses, λc is a wavelength falling within a visible light wavelength region of 400 nm to 700 nm, and λi is a wavelength falling within a wavelength region of 400 nm to 500 nm, 500 to 600 nm, or 600 nm to 70 nm.

In further aspect of the projection display apparatus according to the invention, the diffraction optical element includes a transmission-type phase grating.

In further aspect of the projection display apparatus according to the invention, each image display element includes a transmission-type liquid crystal element.

In further aspect of the projection display apparatus according to the invention, a sectional shape of said diffraction optical element is a kinoform shape or a stepwise shape that has not less than eight steps and approximates the kinoform shape.

In further aspect of the projection display apparatus according to the invention, the color separation means separates light from the light source into beams having red, green, and blue wavelength regions.

In further aspect of the projection display apparatus according to the invention, the diffraction optical element is inserted in an optical path of the beam in the blue wavelength region.

In further aspect of the projection display apparatus according to the invention, diffraction optical elements are inserted in at least two of the optical paths between said plurality of image display elements and said color combining means.

In further aspect of the projection display apparatus according to the invention, said diffraction optical elements are designed to exhibit the maximum diffraction efficiency at different wavelengths.

In further aspect of the projection display apparatus according to the invention, the diffraction optical element is inserted in each of optical paths between said plurality of image display elements and said color combining means.

In further aspect of the projection display apparatus according to the invention, said color combining means includes a dichroic prism which has at least two light incidence surfaces, and combines beams having different wavelength regions from the respective incidence surfaces to output the combined beam.

In further aspect of the projection display apparatus according to the invention, said color combining means comprises dichroic mirrors for transmitting, reflecting, and combining the beams having the different wavelength regions.

According to another aspect of the invention, there is provided an information processing system which comprises the projection display apparatus mentioned above and a computer for generating image information to be supplied to said projection display apparatus.

According to another aspect of the invention, there is provided an image recording/reproducing system which comprises the projection display apparatus as mentioned above and an image recording/reproducing device connected to said projection display apparatus to record and/or reproduce image information to be supplied to said projection display apparatus.

According to another aspect of the invention, there is provided a projection display apparatus which comprises color separation means for separating light from a light source into a plurality of beams having different wavelength regions, a plurality of image display elements each inserted in each optical paths of the beams separated by said color separation means so as to be illuminated by the beams, color combining means for combining the beams emerging from said plurality of image display elements and projection means for projecting the beams combined by said color combining means on a projection surface, wherein a diffraction optical element is inserted in at least one of a plurality of optical paths between said plurality of image display elements and said color combining means.

BRIEF DESCRIPTION OF THE DRAWINGS

FIG. 4 is a table showing an example of numerical values (set values) for the radius of curvature, refractive index, Abbe constant, and interval between optical elements for each optical element in the optical system of the first embodiment;

FIGS. 7A and 7B are graphs showing chromatic aberration of magnification in the first embodiment, in which FIG. 7A is a graph showing aberration at the wide-angle end and FIG. 7B is a graph showing aberration at the telephoto end;

FIGS. 9A, 9B, and 9C are graphs for explaining the wavelength dependence and angle dependence of the diffraction optical element, in which FIG. 9A is a graph when the ray incident angle is 0°, FIG. 9B is a graph when the ray incident angle is 15°, and FIG. 9C is a graph when the ray incident angle is −15°;

FIG. 12 is a table showing an example of numerical values (set values) for the radius of curvature, refractive index, Abbe constant, and interval between optical elements for each optical element in the optical system of the second embodiment;

FIGS. 15A and 15B are graphs showing chromatic aberration of magnification in the second embodiment, in which FIG. 15A is a graph showing aberration at the wide-angle end and FIG. 15B is a graph showing aberration at the telephoto end;

FIG. 19 is a table showing an example of numerical values (set values) for the radius of curvature, refractive index, Abbe constant, and interval between optical elements for each optical element in the optical system of the third embodiment;

FIGS. 22A and 22B are graphs showing chromatic aberration of magnification in the third embodiment, in which FIG. 22A is a graph showing aberration at the wide-angle end and FIG. 22B is a graph showing aberration at the telephoto end;

FIG. 24 is a sectional view for explaining an overview of an optical system in a conventional projection display apparatus;

FIGS. 25A and 25B are sectional views of optical systems for explaining prior arts for reducing chromatic aberration of a projection optical system;

FIGS. 27A, 27B, and 27C are views for explaining a prior art which reduces image degradation caused by parasitic-diffracted light (stray light) of a diffraction optical element used in a wide wavelength region or a plurality of wavelength regions;

DETAILED DESCRIPTION OF THE PREFERRED EMBODIMENTS

Preferred embodiments of the present invention will be described in detail below with reference to the accompanying drawings. In the following embodiments, the arrangement of a projection optical system in a projection display apparatus shown in FIG. 24 will be illustrated and described. An illumination optical system 110 is the same as in the prior art, and an illustration and description thereof will be omitted.

(First Embodiment)

Figure 1:
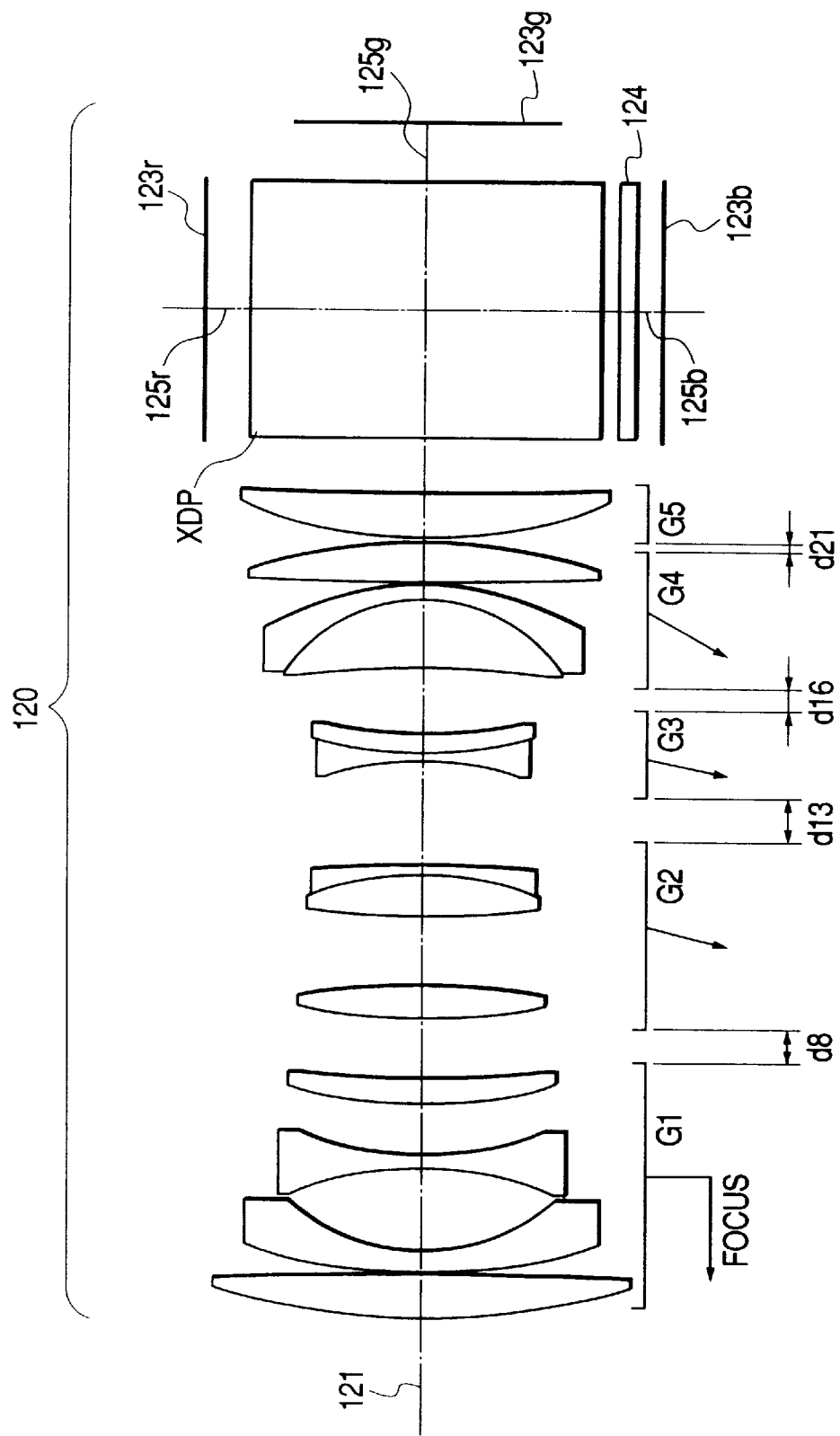
FIG. 1 is a sectional view at the wide-angle end of an optical system in a projection display apparatus according to the first embodiment.
Figure 2:
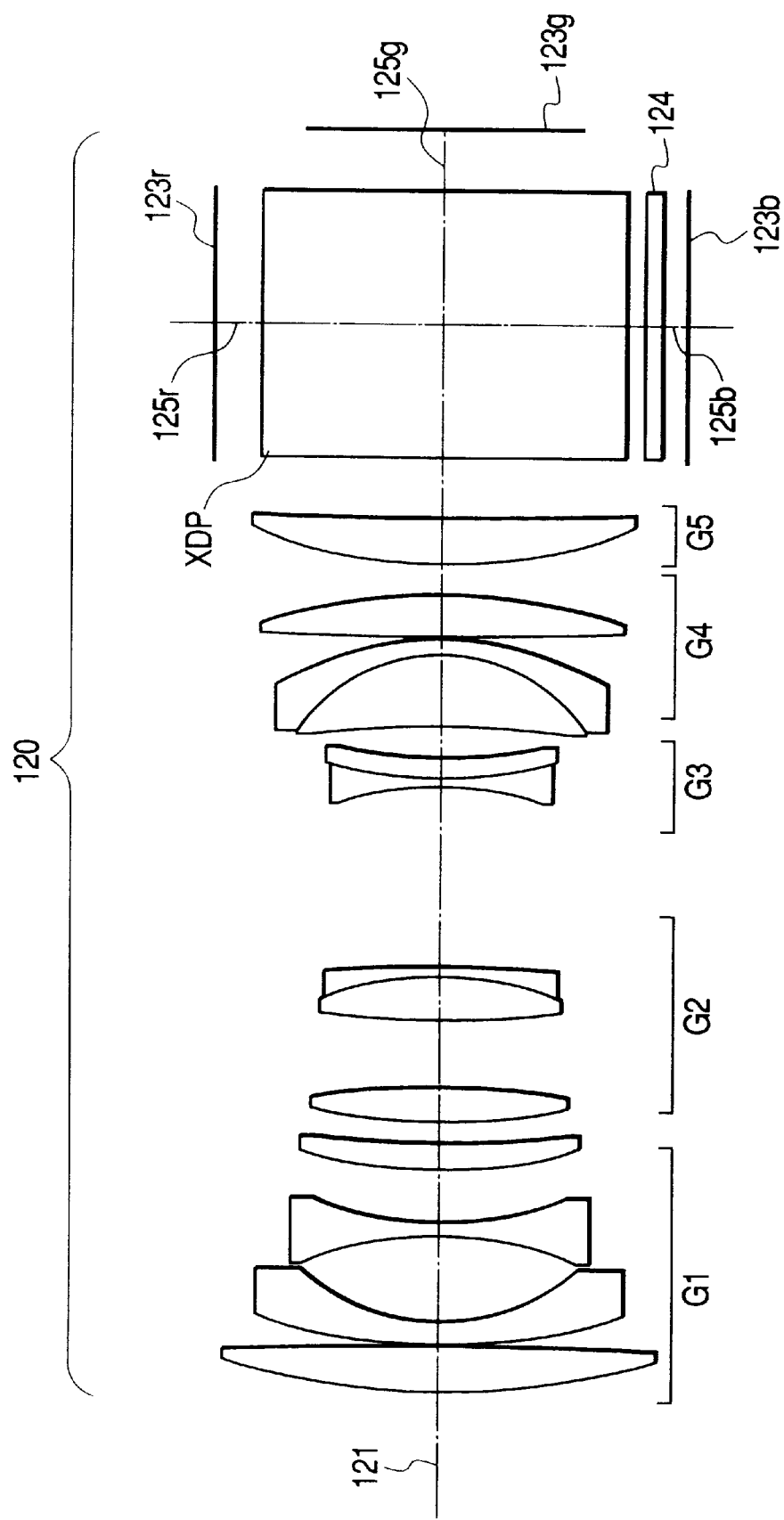
FIG. 2 is a sectional view at the telephoto end of the optical system in the projection display apparatus according to the first embodiment.

The first embodiment of the present invention will be described. FIGS. 1 and 2 show the section of a projection optical system 120 in a projection display apparatus according to the first embodiment. FIG. 1 is a sectional view at the wide-angle end, and FIG. 2 is a sectional view at the telephoto end. The projection optical system 120 has an optical axis 121. Focal planes 123r, 123g, and 123b respectively correspond to red, green, and blue, and image display elements such as liquid crystal panels (not shown) are arranged near the focal planes 123r, 123g, and 123b in accordance with the respective colors. In the projection optical system 120, lens units G1 to G5 are first to fifth units constituting an optical system. As shown in FIGS. 1 and 2, the lens units G2, G3, and G4 are moved along the optical axis to achieve zooming.

Focusing is done by moving the lens unit G1 along the optical axis. The lens unit G5 is fixed.

Figure 3:
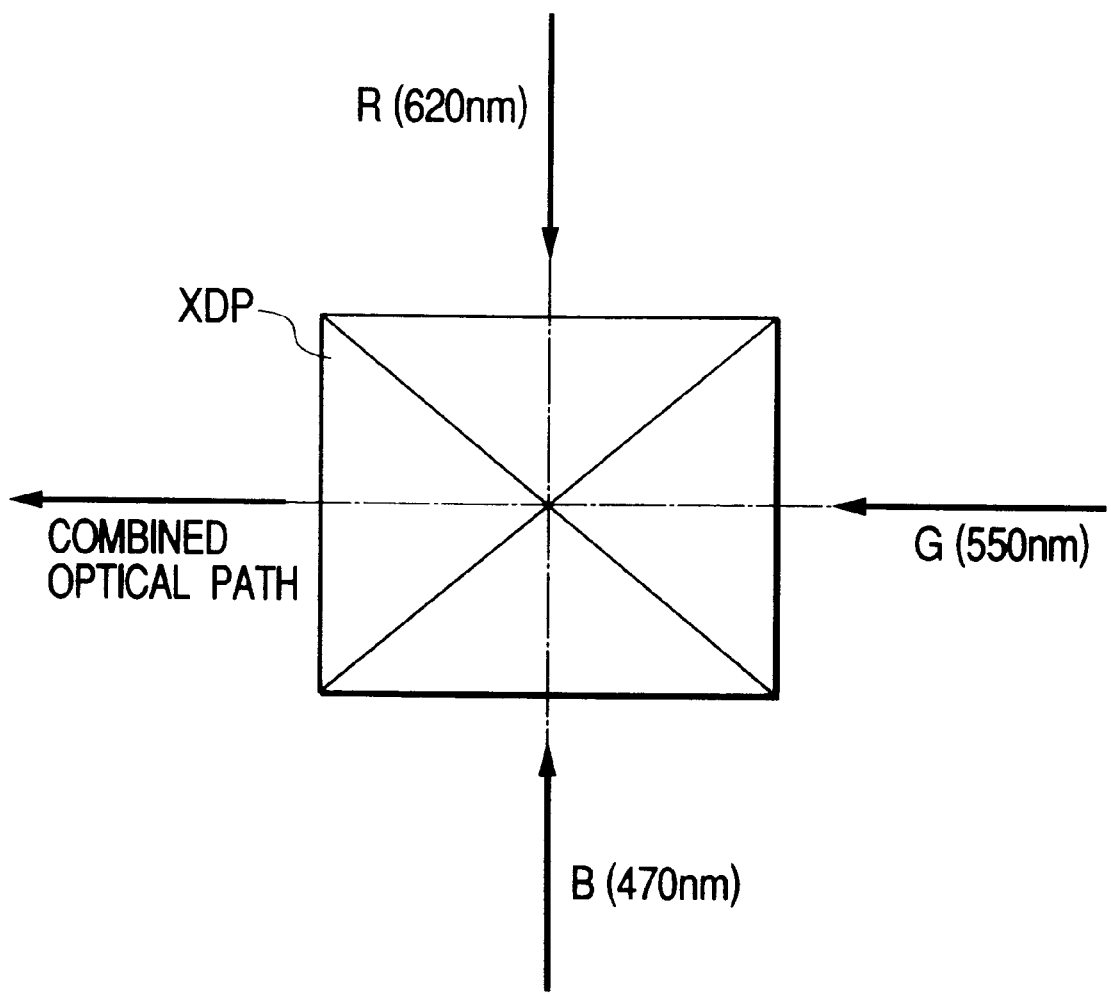
FIG. 3 is a view for explaining the function of a dichroic prism serving as a color combination system.

A dichroic prism XDP serves as a color combination system. As shown in FIG. 3, the dichroic prism XDP is a cross prism constituted to combine different light components in green, red, and blue wavelength regions.

In FIG. 1, m optical axes 125r, 125g, and 125b after the dichroic prism XDP correspond to the red, green, and blue wavelength regions. In the optical system of the first embodiment, an optical element (to be referred to as a diffraction optical element hereinafter) 124 having a diffraction optical element formed on its surface is inserted in the optical axis 125b near the incident surface of the dichroic prism XDP between this incident surface and the blue focal plane 123b.

FIG. 4 shows an example of numerical values (set values) for the radius of curvature, refractive index, Abbe constant, and interval between optical elements for each optical element in the projection optical system 120 of the first embodiment. In this embodiment, the diffraction optical element 124 is inserted in only the blue optical path. Set values on the optical path subsequent to surface No. 24 of the dichroic prism are shown below set values on the red and green optical paths. Note that surface No. 24 represents the exit surface of the dichroic prism; surface No. 25, the incident surface of the dichroic prism; surfaces Nos. 26 and 27, the exit and incident surfaces of the diffraction optical element. The interval has 550 nm as a reference. The characteristics of an optical system constituted on the basis of the set values will be explained.

Figure 5:
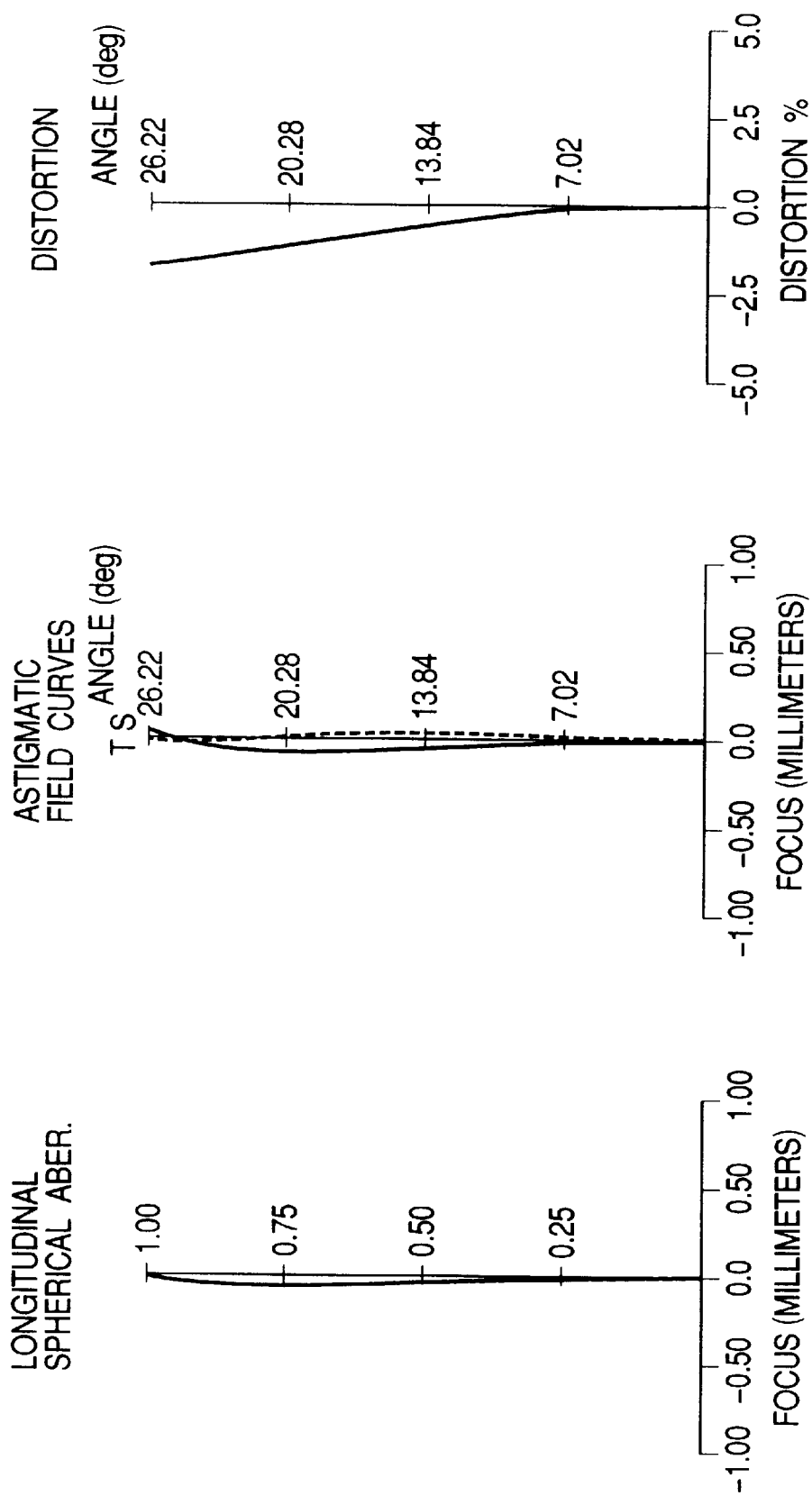
FIG. 5 shows graphs of longitudinal aberration at the wide-angle end of the optical system in the first embodiment.
Figure 6:
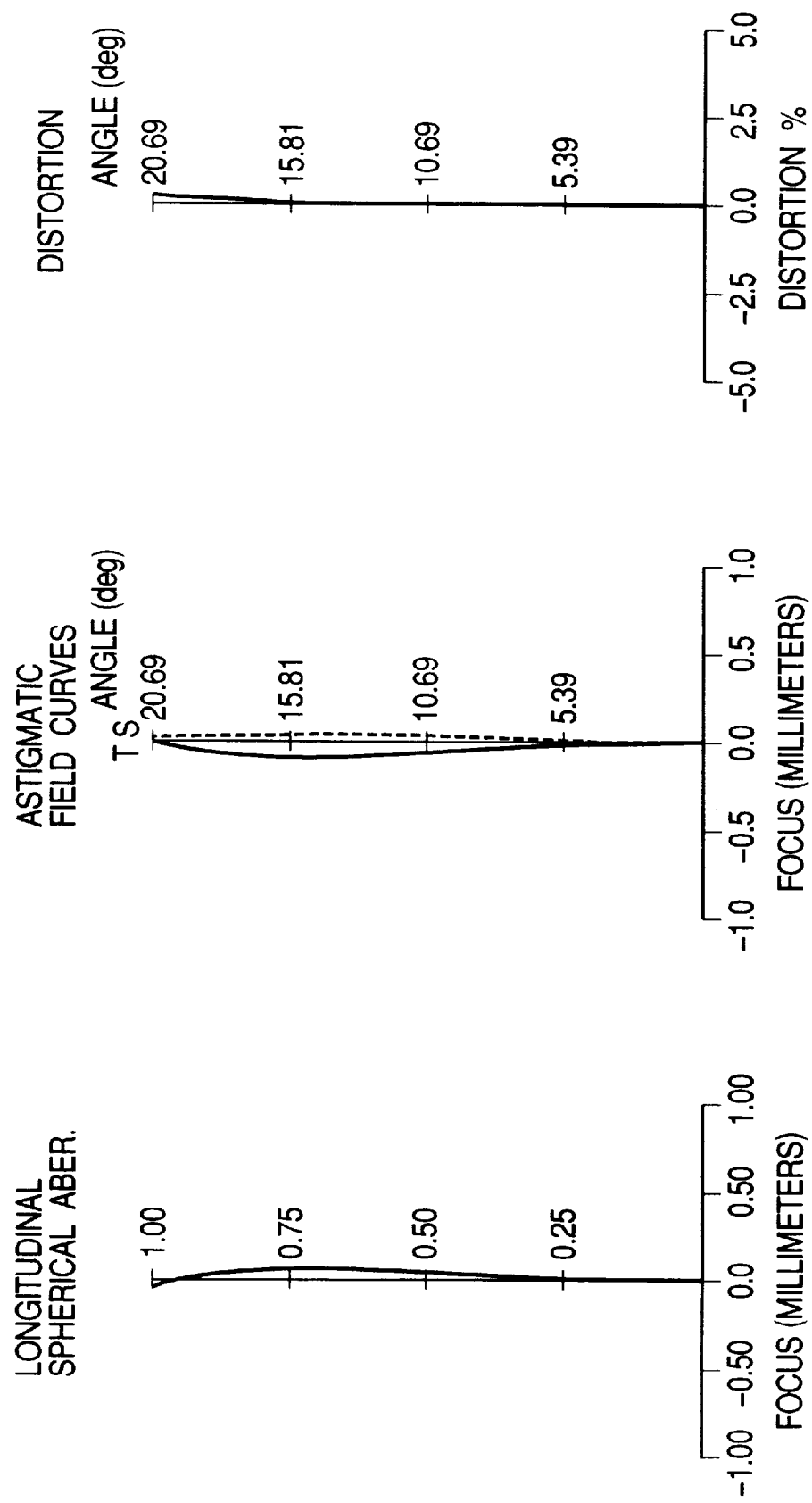
FIG. 6 shows graphs of longitudinal aberration at the telephoto end of the optical system in the first embodiment.
Figure 7A:
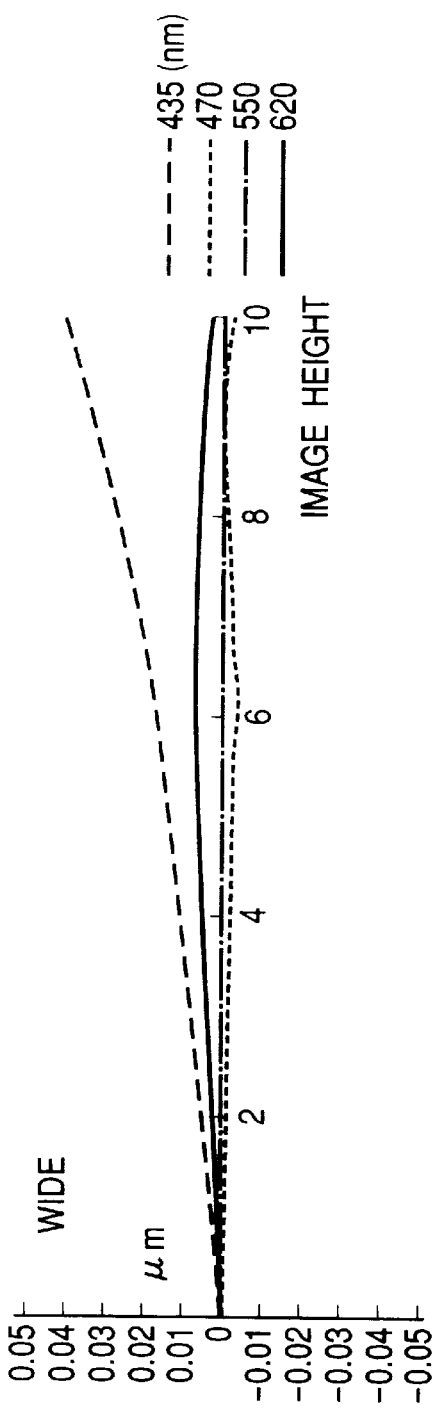
Figure 7B:
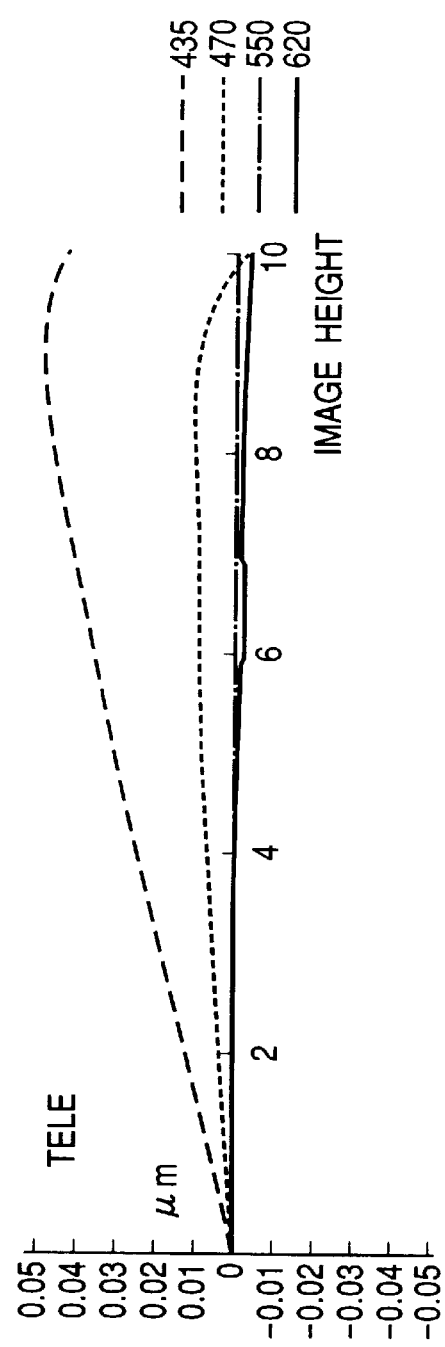

FIGS. 5 and 6 are graphs showing longitudinal aberration at the wide-angle and telephoto ends in the first embodiment. FIGS. 7A and 7B show chromatic aberration of magnification at the wide-angle and telephoto ends. Chromatic aberration of magnification is represented by the difference of the ray height of a principal ray on each of focal planes having wavelengths of 470 nm and 620 nm with respect to the wavelength (550 nm) on the optical axis 125g.

At this time, the diffraction optical element 124 has a design wavelength of 550 nm and the 1st design order. A phase function φ(r) is given by $$\phi(r)=(2\pi/\lambda o)\cdot(C1\cdot r^2+C2\cdot r^4+C3\cdot r^6+C4\cdot r^8+C5\cdot r^{10}+C6\cdot r^{12})=(2\pi/\lambda o)\cdot\Sigma(C1\cdot r^{2i})$$

Figure 8:
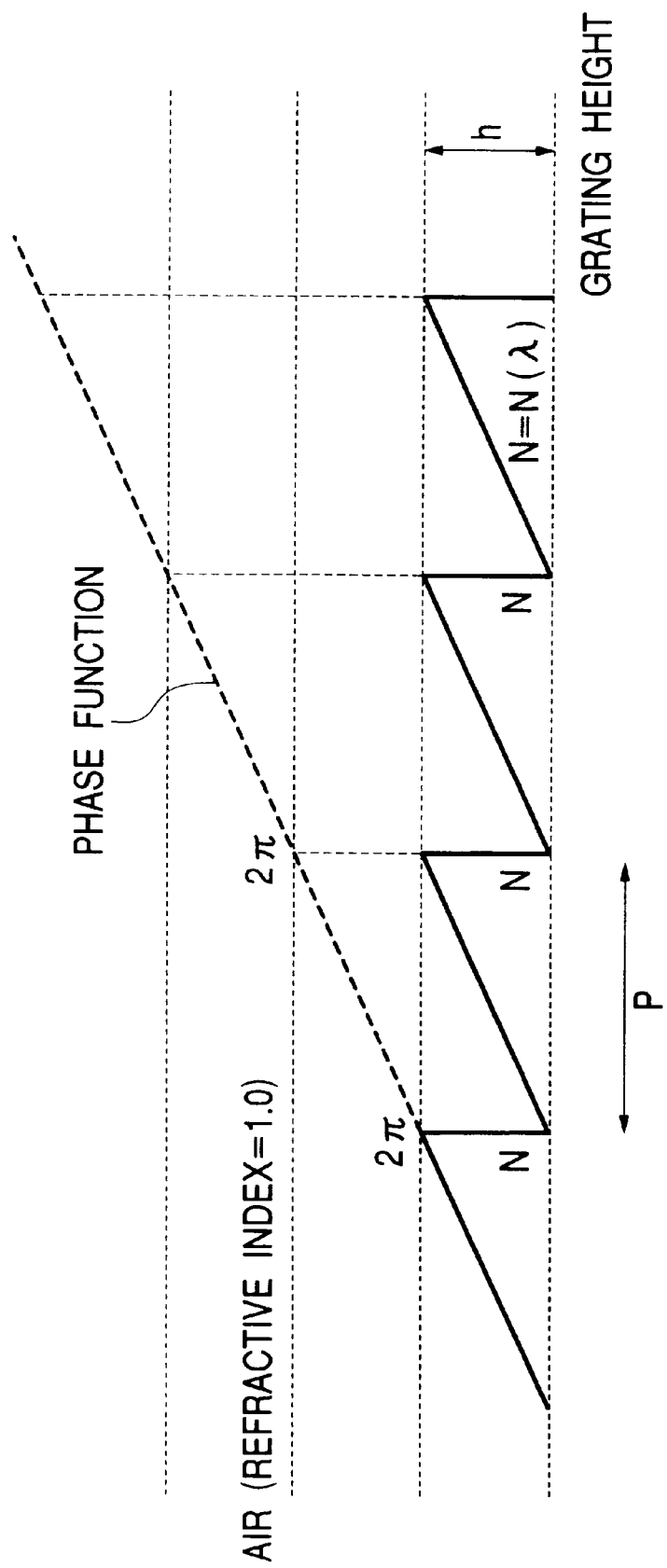
FIG. 8 is a view for explaining the grating structure, phase function, and the like of a diffraction optical element.

The phase function φ(r) is represented by the coefficient shown in FIG. 4.

λo is the design wavelength of the phase function (here, λo is 550 nm). A pitch P of the grating structure is determined by the phase function. When the design order is 1, the grating shape is determined to obtain a phase difference of 2π in the phase function (FIG. 8).

A grating height h greatly influences the wavelength dependence of the diffraction efficiency.

Letting h be the grating height, and N(λ) be the refractive index, an optical path difference L is given by $$L=(N(\lambda)-1)h$$

Letting λ be the transmission wavelength, the phase difference is 2π·L/λ.

For the phase difference=2π, the diffraction efficiency maximizes at the wavelength λ.

In the first embodiment, the diffraction optical element 124 is inserted in the optical path of blue light (representative wavelength is 470 nm), so the diffraction efficiency of blue light must be high.

Figure 9A:
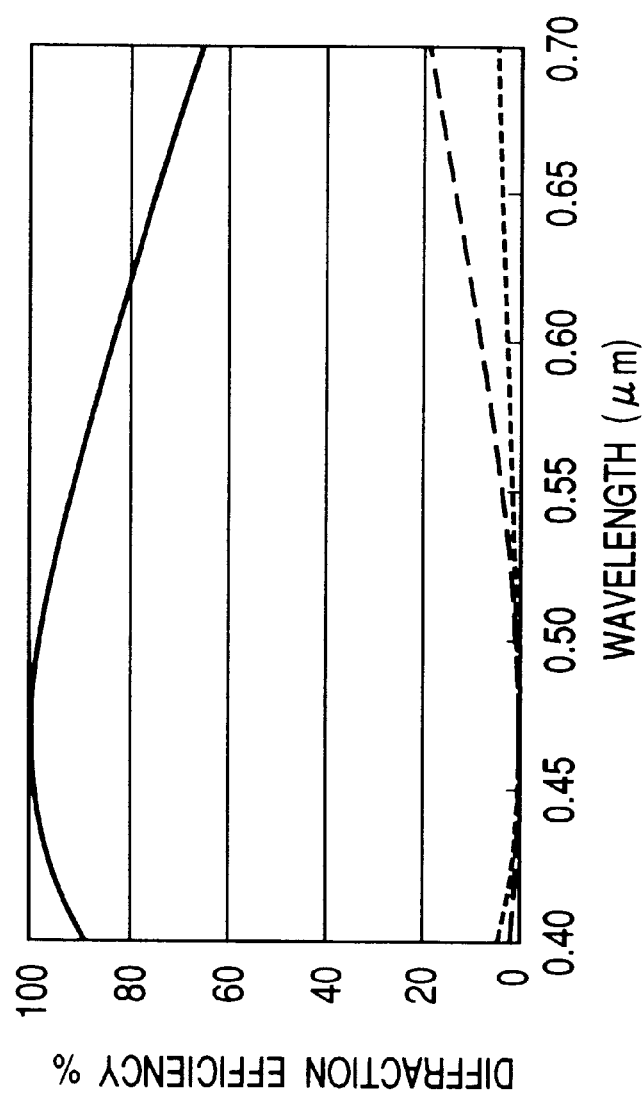
Figure 9B:
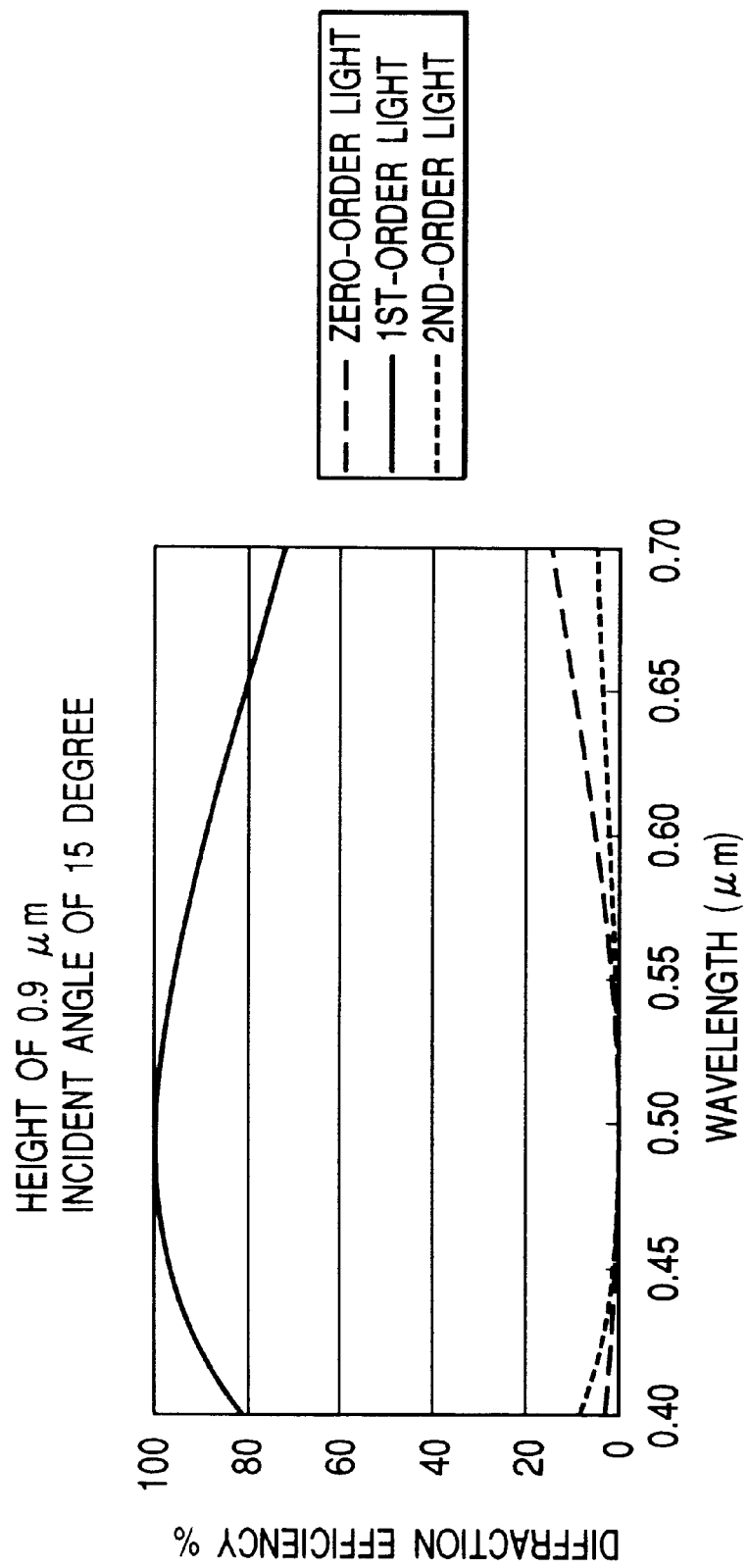

FIGS. 9A, 9B, and 9C are graphs showing the ray incident angle and the wavelength dependence of the diffraction efficiency when the refractive index of the material constituting the diffraction optical element 124 is 1.524, the Abbe constant is 50.78, and the grating height is 0.9 μm. FIG. 9A shows a case wherein the ray incident angle is 0°, FIG. 9B shows a case wherein the ray incident angle is 15°, and FIG. 9C shows a case wherein the ray incident angle is −15°. In FIGS. 9A to 9C, 0, 1, and 2 represent diffraction orders.

In FIG. 9A, when the ray incident angle is 0°, the diffraction efficiency around 470 nm is as high as 90% or more, and the diffraction efficiency of zero- or 2nd-order parasitic-diffracted light (stray light) is very low in this wavelength region.

To the contrary, in FIGS. 9B and 9C, when the incident angle is 15° or −15°, the wavelength at the peak of the diffraction efficiency shifts to the large wavelength side, but the diffraction efficiency of the design order is high around 470 nm and that of the parasitic order is low, similar to the ray incident angle of 0°.

In this manner, the incident angle dependence of the diffraction efficiency is relatively low in the grating structure of the first embodiment. The projection optical system of this embodiment is designed to be nearer the telecentric side than the image side (image display element side). This reduces variations between the field angles of rays which strike the diffraction optical element 124. The invention, however, is not limited to be applied to the telecentric optical system.

Although the diffraction optical element is inserted in the optical path of blue light in the first embodiment, the same effects can also be obtained when the diffraction optical element is inserted in the optical path of red or green light. The wavelength at the peak of the diffraction efficiency must be adjusted near the central or peak wavelength of light transmitted through an optical path in which the diffraction optical element is inserted. This can be achieved by properly selecting the grating height or the refractive index and Abbe constant forming a grating. The refractive index and Abbe constant of the material forming the grating are 1.524 and 50.78 in the first embodiment, but the present invention is not limited to them.

In the first embodiment, the grating shape of the diffraction optical element 124 is a so-called kinoform shape as shown in FIG. 8. The inclined portion of the kinoform shape may be approximated to a stepwise shape. In this case, the same effects can be attained if the number of approximated steps is large. More specifically, an approximated shape with 8 or more steps is desirable.

The grating surface of the diffraction optical element 124 is preferably coated for antireflection, similar to a general optical glass.

(Second Embodiment)

Figure 10:
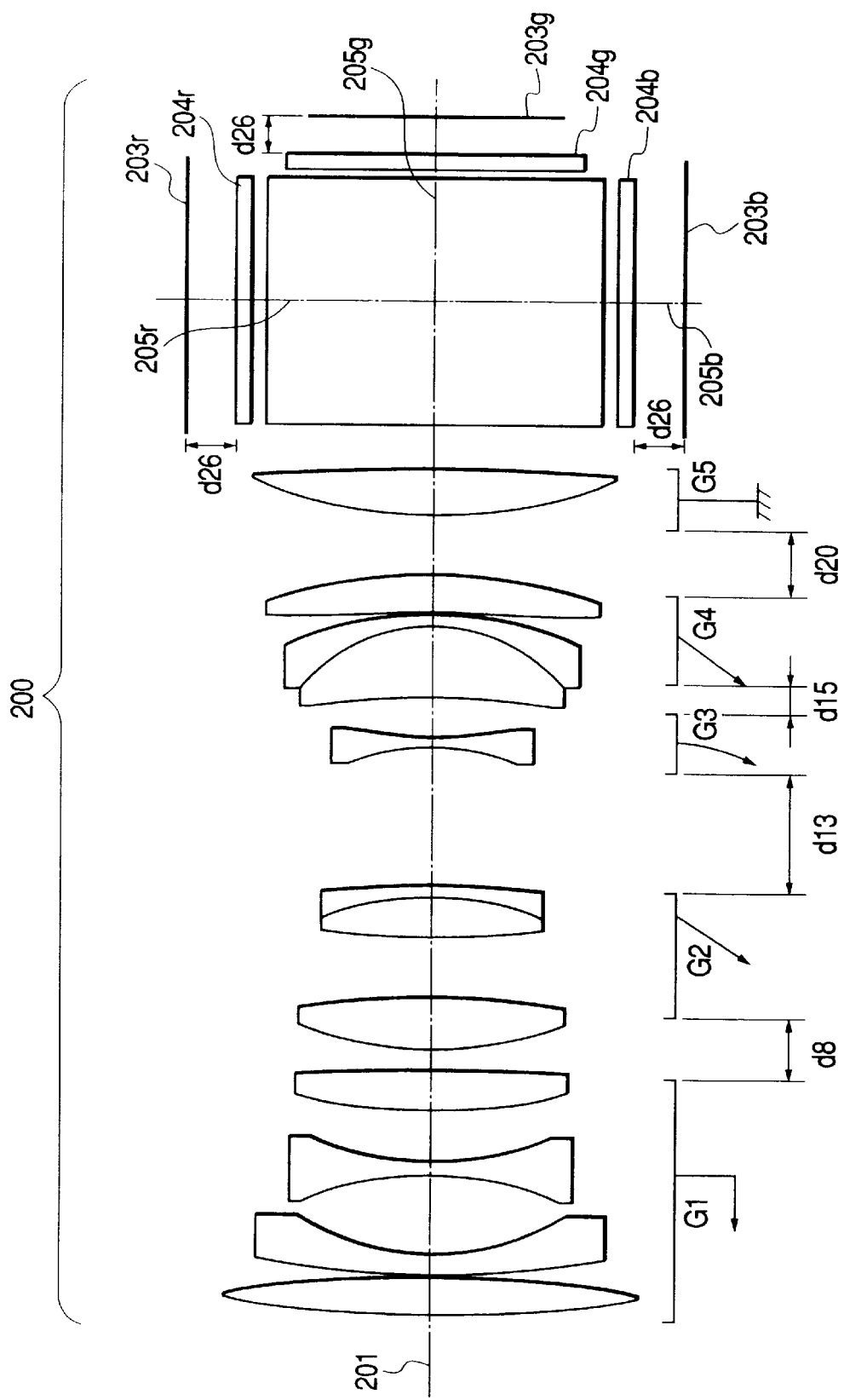
FIG. 10 is a sectional view at the wide-angle end of an optical system in a projection display apparatus according to the second embodiment.
Figure 11:
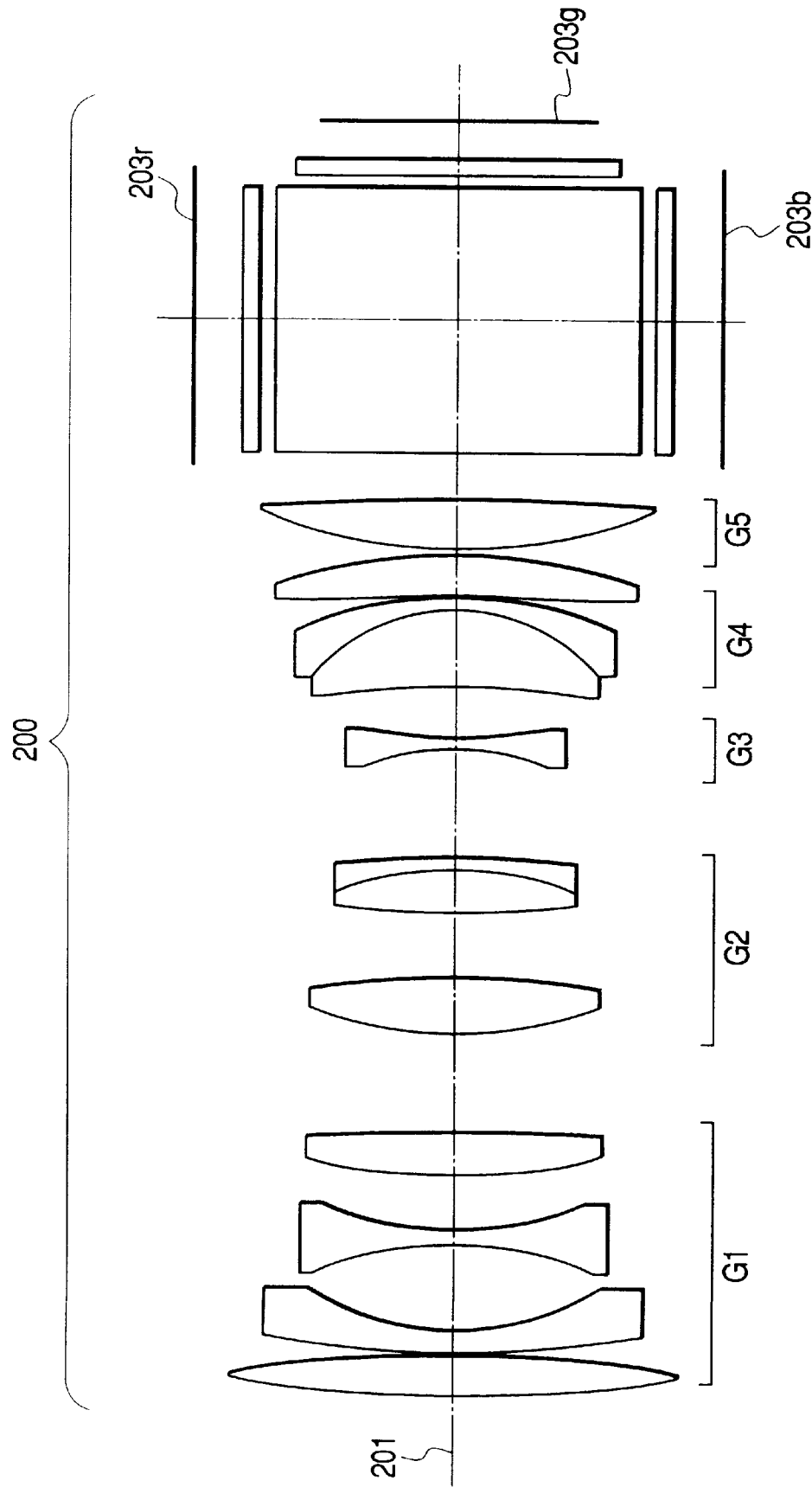
FIG. 11 is a sectional view at the telephoto end of the optical system in the projection display apparatus according to the second embodiment.

The second embodiment of the present invention will be described. FIGS. 10 and 11 show the section of a projection optical system 200 in a projection display apparatus according to the second embodiment. FIG. 10 is a sectional view at the wide-angle end, and FIG. 11 is a sectional view at the telephoto end. The projection optical system 200 has an optical axis 201. Focal planes 203r, 203g, and 203b respectively represent red, green, and blue focal plane, and liquid crystal panels or the like are arranged near the focal planes 203r, 203g, and 203b in accordance with the respective colors.

Lens units G1 to G5 are first to fifth units constituting an optical system. As shown in FIGS. 10 and 11, the lens units G2, G3, and G4 are moved along the optical axis to zoom.

Focusing is done by moving the lens unit G1 along the optical axis. The lens unit G5 is fixed in position. A dichroic prism XDP serving as a color combination system has the same arrangement as that of the first embodiment.

In FIG. 10, optical paths 205r, 205g, and 205b correspond to respective wavelength regions. In the optical system of the second embodiment, optical elements (to be referred to as diffraction optical elements hereinafter) 204r, 204g, and 204b having diffraction optical elements formed on their surfaces are inserted in the optical paths 205r, 205g, and 205b.

The diffraction optical elements 204r, 204g, and 204b in this embodiment are represented by the same phase function, i.e., represented by the phase function of 1st-order light as the design order with a design wavelength of 550 nm.

FIG. 12 shows an example of numerical values (set values) for the radius of curvature, refractive index, Abbe constant, and interval between optical elements for each optical element in the optical system of the second embodiment. The characteristics of an optical system constituted based on the set values will be explained.

Figure 13:
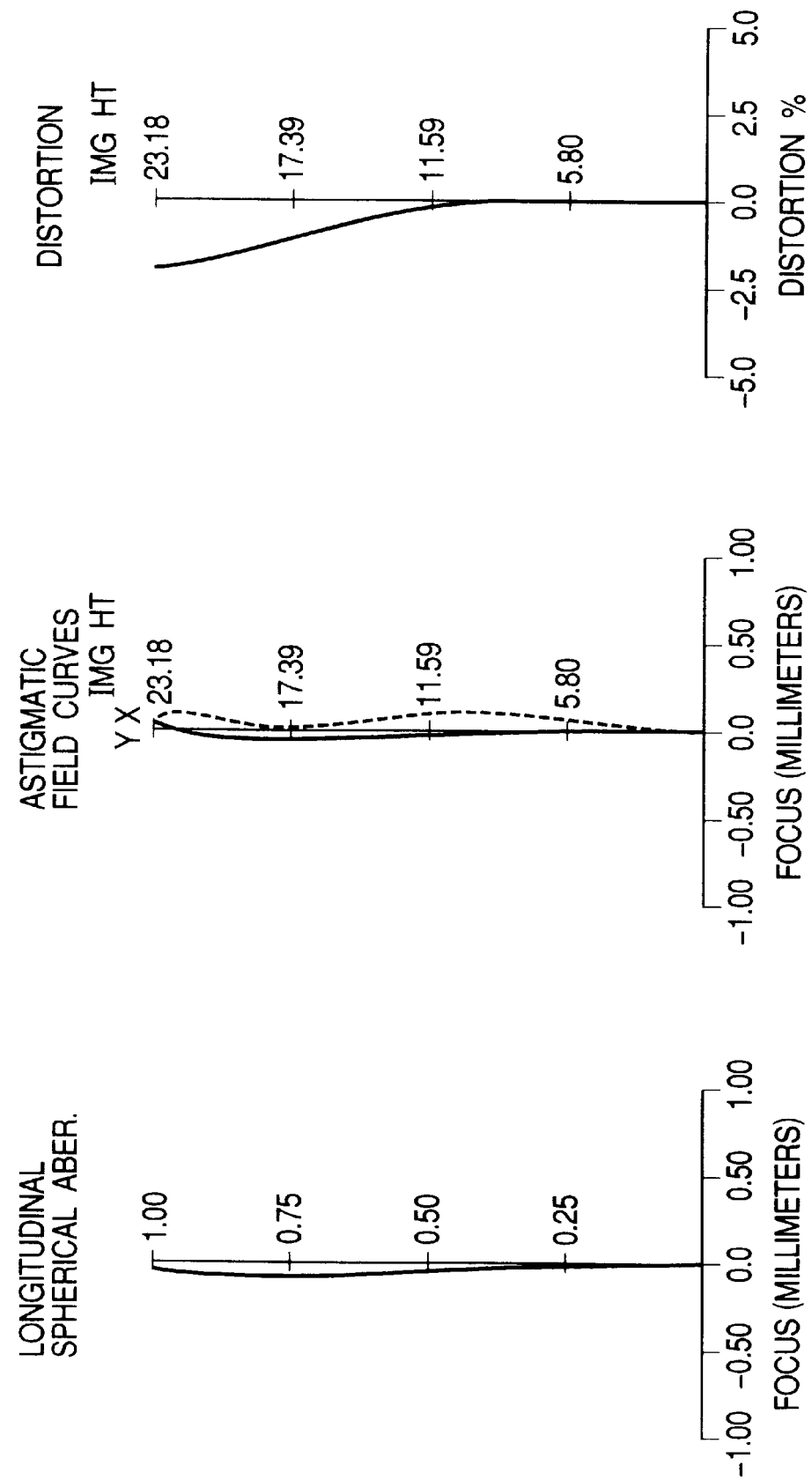
FIG. 13 shows graphs of longitudinal aberration at the wide-angle end of the optical system in the second embodiment.
Figure 14:
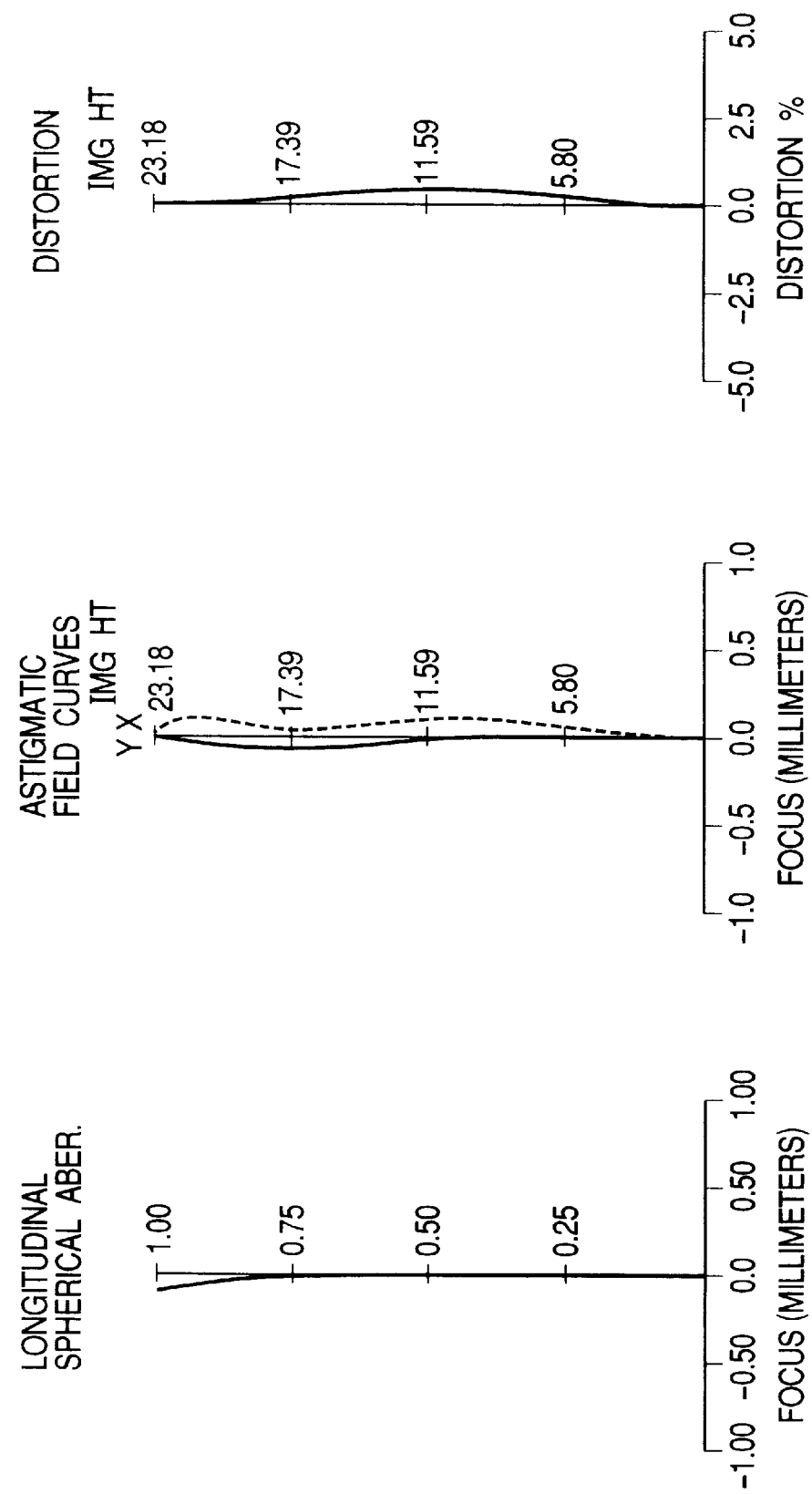
FIG. 14 shows graphs of longitudinal aberration at the telephoto end of the optical system in the second embodiment.

FIGS. 13 and 14 are graphs showing longitudinal aberration at the wide-angle and telephoto ends in the second embodiment. FIGS. 15A and 15B show chromatic aberration of magnification at the wide-angle and telephoto ends.

Since the diffraction optical elements 204r, 204g, and 204b are inserted in optical paths having different spectral characteristics, the diffraction efficiency is designed to maximize in accordance with the representative wavelength on each optical path.

For example, when the diffraction optical elements 204r, 204g, and 204b are formed from the same material as that of the diffraction optical element 124 in the first embodiment, the grating height of the diffraction optical element 204b inserted in the optical path of blue light is set to about 0.9 μm, that of the diffraction optical element 204g inserted in the optical path of green light is set to about 1 μm, and that of the diffraction optical element 204r inserted in the optical path of red light is set to about 1.2 μm.

Figure 16:
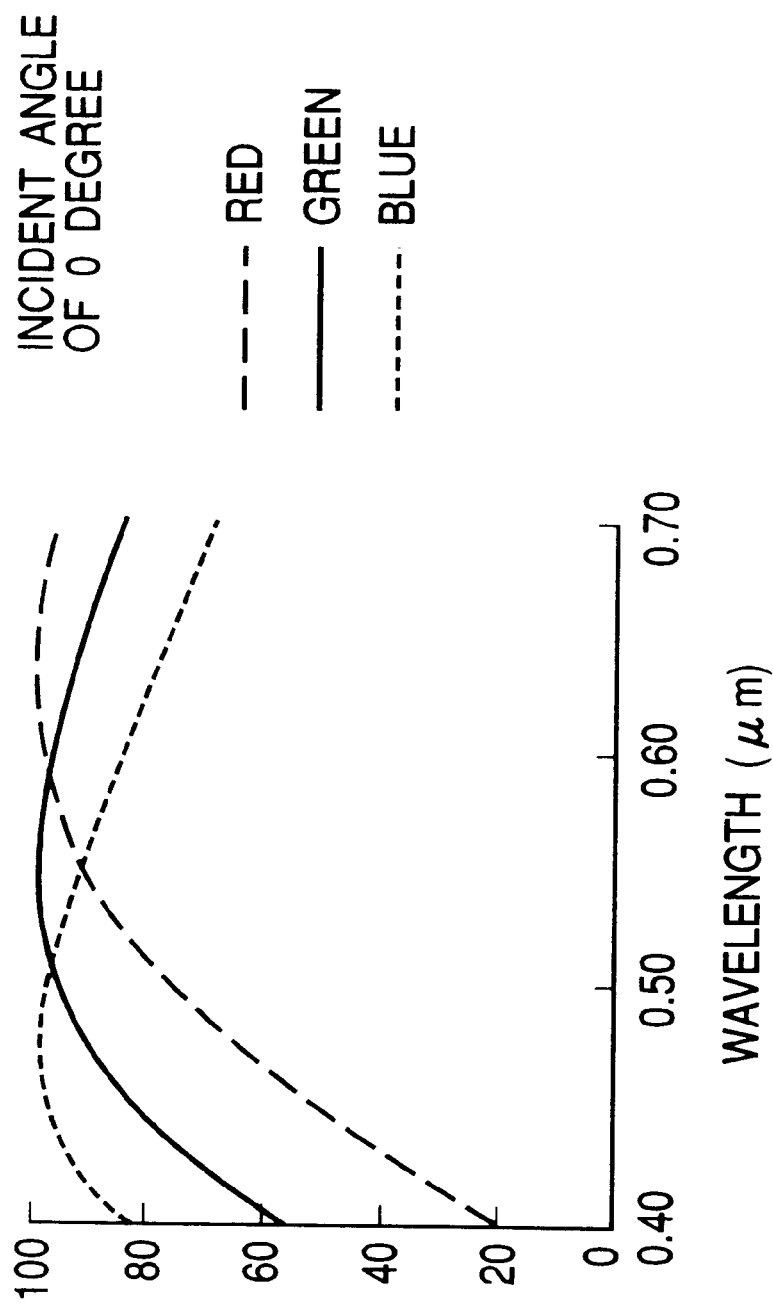
FIG. 16 is a view for explaining the wavelength dependence of the diffraction efficiency in each diffraction optical element.

FIG. 16 shows the diffraction efficiency for the 1st design order for each optical path. FIG. 16 indicates that the diffraction efficiency changes depending on the optical path. In the second embodiment, the representative wavelengths of the respective optical paths are 470 nm for blue light, 550 nm for green light, and 620 nm for red light. As is apparent from FIG. 16, the peak of each diffraction efficiency is set around a corresponding representative wavelength.

In the second embodiment, the diffraction efficiencies corresponding to the respective optical paths are set by changing the grating heights of the diffraction optical elements 204r, 204g, and 204b. Alternatively, the diffraction efficiencies may be set by changing the refractive indices of the gratings, i.e., the materials of the diffraction optical elements 204r, 204g, and 204b, or by changing both the grating heights and materials.

In this embodiment, the design wavelength and deign order of the diffraction optical elements 204r, 204g, and 204b are 550 nm and 1st order, respectively. However, the present invention is not limited to them.

The phase functions of the diffraction optical elements 204r, 204g, and 204b inserted in the respective optical paths are the same in the second embodiment, but may be different between their phase paths.

The three wavelengths at which the diffraction efficiencies of the diffraction optical elements 204r, 204g, and 204b maximize are different. Alternatively, e.g., the wavelengths of the diffraction optical elements 204r and 204g may be the same. In this case, the number of components can be decreased though the diffraction efficiency cannot be increased.

(Third Embodiment)

Figure 17:
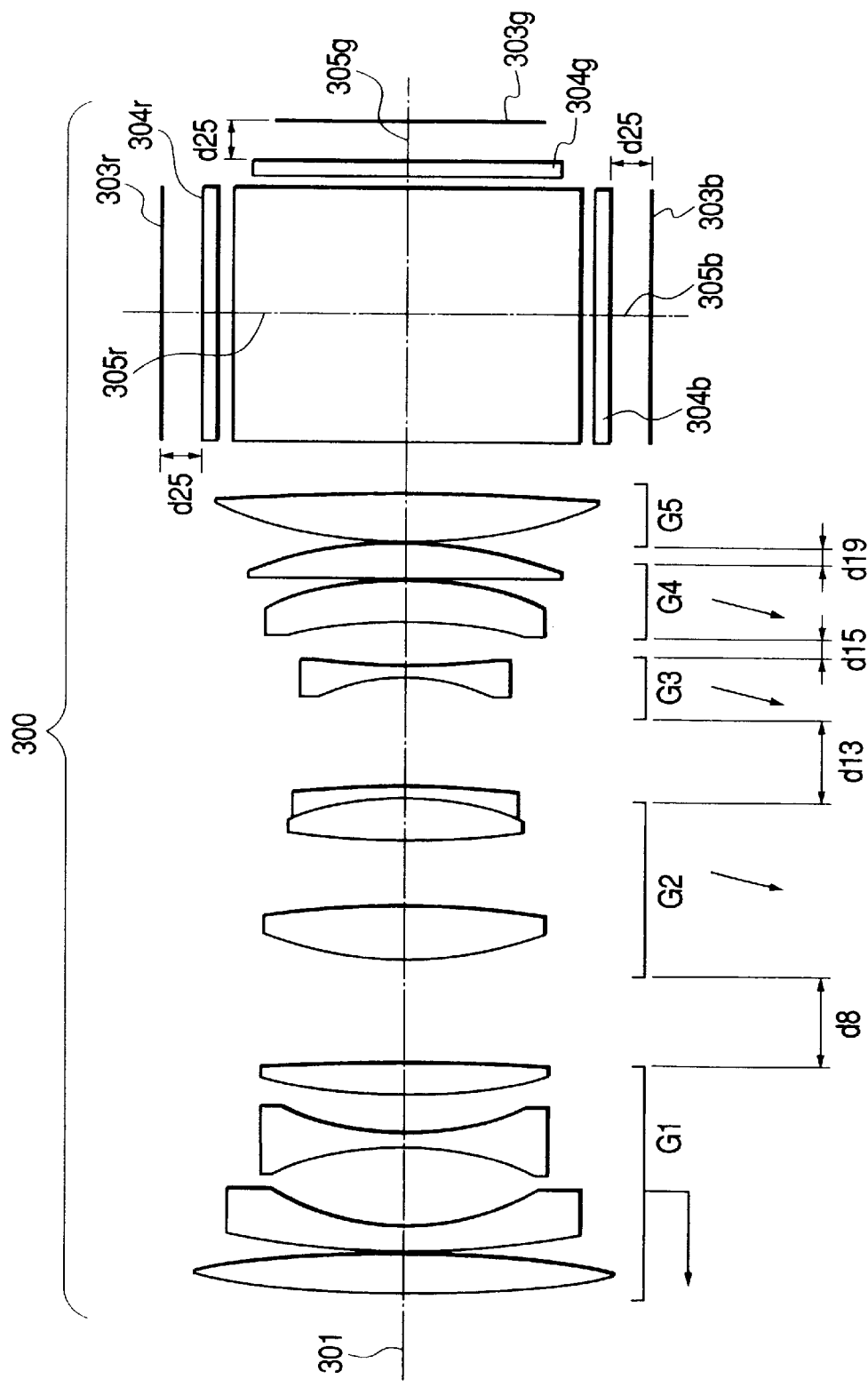
FIG. 17 is a sectional view at the wide-angle end of an optical system in a projection display apparatus according to the third embodiment.
Figure 18:
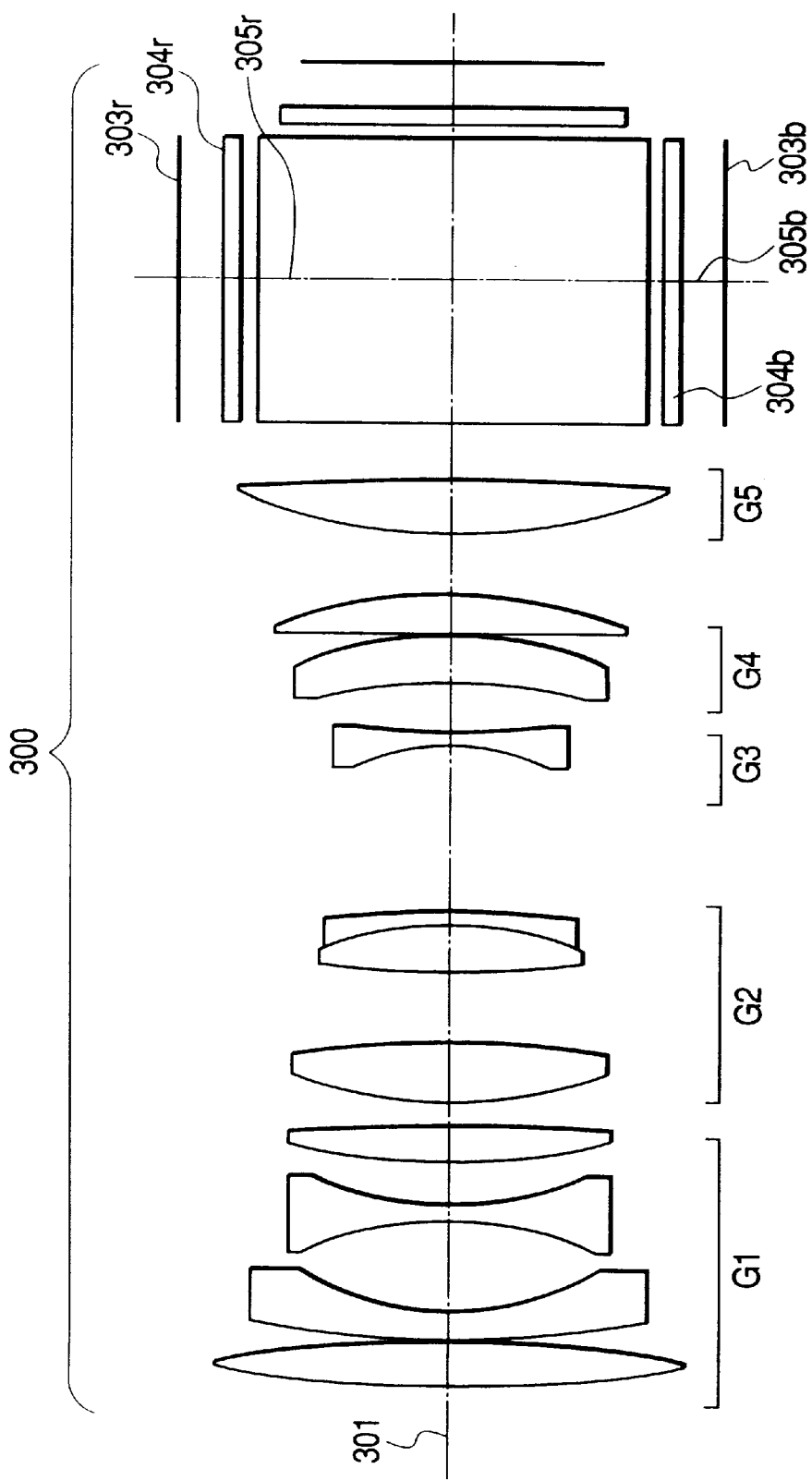
FIG. 18 is a sectional view at the telephoto end of the optical system in the projection display apparatus according to the third embodiment.

The third embodiment of the present invention will be described. FIGS. 17 and 18 show the section of a projection optical system 300 in a projection display apparatus according to the third embodiment. FIG. 17 is a sectional view at the wide-angle end, and FIG. 18 is a sectional view at the telephoto end. The projection optical system 300 has an optical axis 301. Focal planes 303r, 303g, and 303b respectively represent red, green, and blue focal planes, and liquid crystal panels or the like are arranged near the focal planes 303r, 303g, and 303b in accordance with the respective colors.

Lens units G1 to G5 are first to fifth units constituting an optical system. As shown in FIGS. 17 and 18, the lens units G2, G3, and G4 are moved along the optical axis to zoom.

Focusing is done by moving the lens unit G1 along the optical axis. The lens unit G5 is fixed in position. A dichroic prism XDP serving as a color combination system has the same arrangement as that of the first embodiment.

In FIG. 17, optical paths 305r, 305g, and 305b correspond to respective wavelength regions. In the optical system of the third embodiment, optical elements (to be referred to as diffraction optical elements hereinafter) 304r, 304g, and 304b having diffraction optical elements formed on their surfaces are inserted in the optical paths 305r, 305g, and 305b.

The diffraction optical elements 304r, 304g, and 304b in this embodiment are represented by the same phase function, i.e., represented by the phase function of 1st-order light as the design order with a design wavelength of 550 nm.

FIG. 19 shows an example of numerical values (set values) for the radius of curvature, refractive index, Abbe constant, and interval between optical elements for each optical element in the projection optical system 300 of the third embodiment. The characteristics of an optical system constituted based on the set values will be explained.

Figure 20:
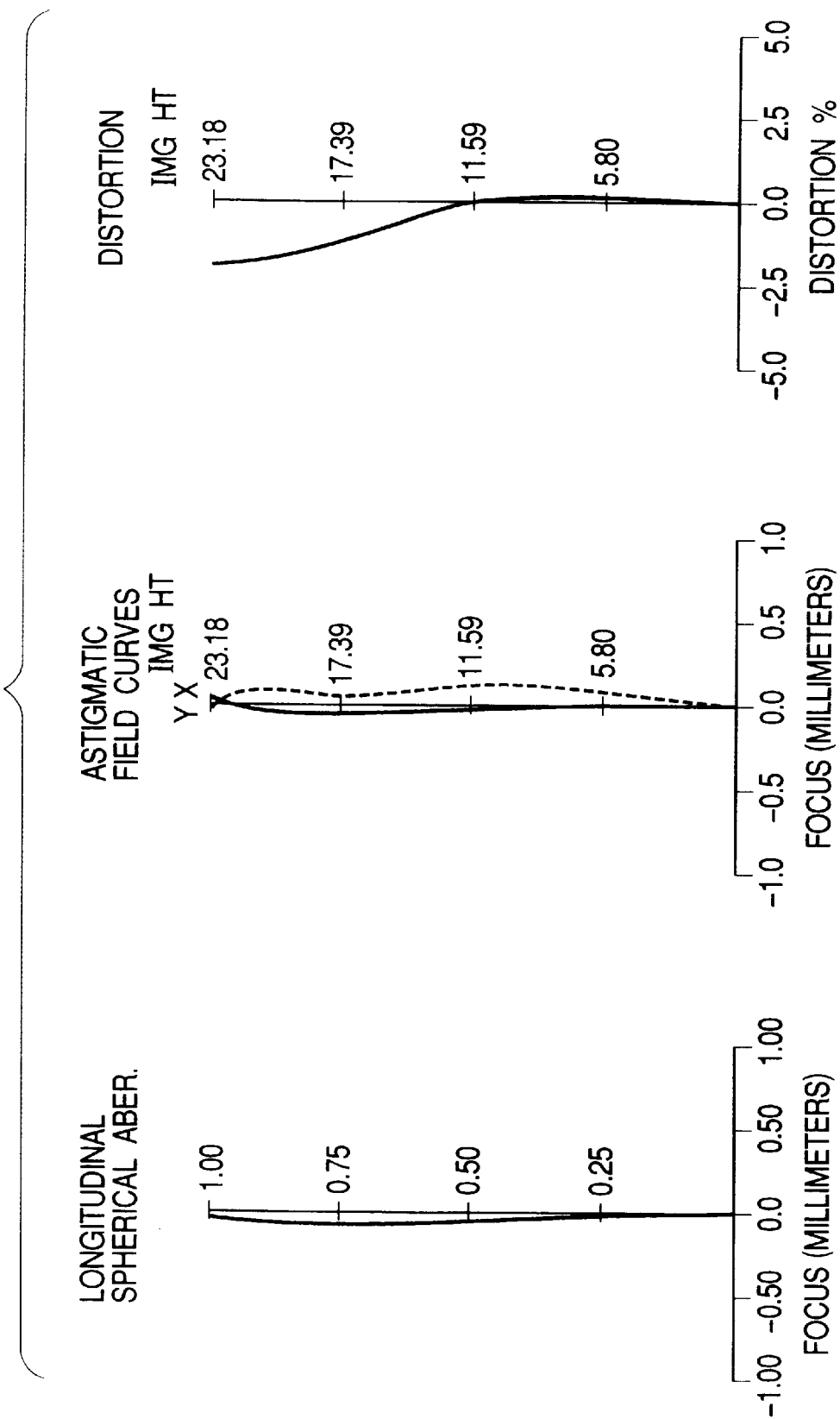
FIG. 20 shows graphs of longitudinal aberration at the wide-angle end of the optical system in the third embodiment.
Figure 21:
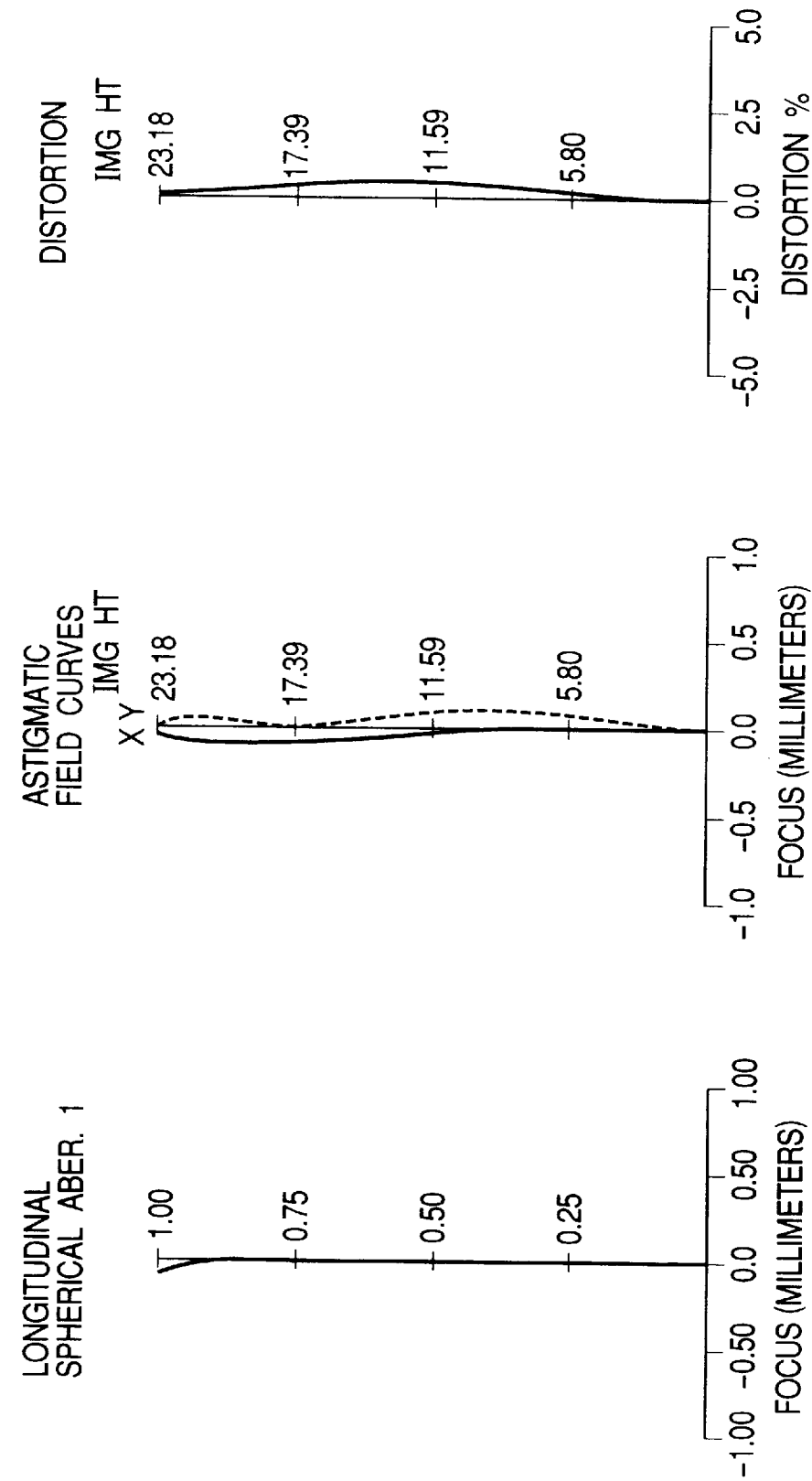
FIG. 21 shows graphs of longitudinal aberration at the telephoto end of the optical system in the third embodiment.
Figure 22A:
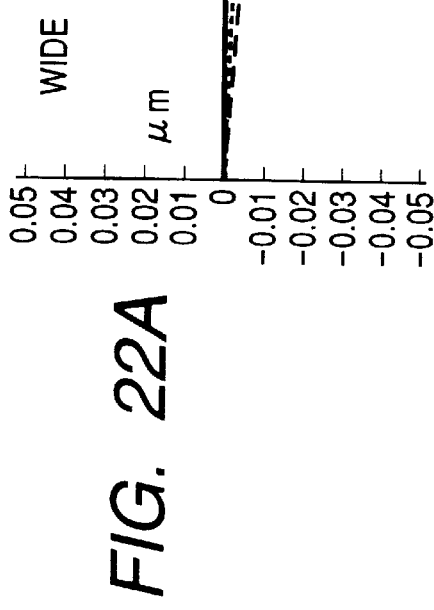
Figure 22B:
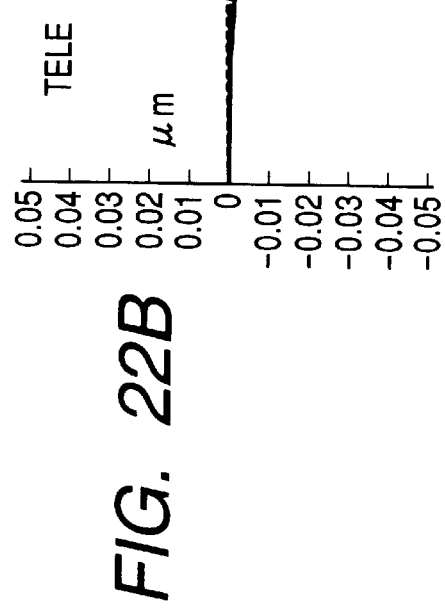

FIGS. 20 and 21 are graphs showing longitudinal aberration at the wide-angle and telephoto ends of the projection optical system 300. FIGS. 22A and 22B show chromatic aberration of magnification at the wide-angle and telephoto ends.

Since the diffraction optical elements 304r, 304g, and 304b are inserted in optical paths having different spectral characteristics, the diffraction efficiency is designed to maximize in accordance with the representative wavelength on each optical path.

For example, when the diffraction optical elements 304r, 304g, and 304b are formed from the same material as that of the diffraction optical element 124 in the first embodiment, the grating height of the diffraction optical element 304b inserted in the optical path of blue light is set to about 0.9 μm, that of the diffraction optical element 304g inserted in the optical path of green light is set to about 1 μm, and that of the diffraction optical element 304r inserted in the optical path of red light is set to about 1.2 μm.

The wavelength dependence of the diffraction efficiency in the diffraction optical elements 304r, 304g, and 304g is the same as in the second embodiment, as shown in FIG. 16. From FIG. 16, the diffraction efficiency changes depending on the optical path. Also in the third embodiment, the representative wavelengths of the respective optical paths are 470 nm for blue light, 550 nm for green light, and 620 nm for red light. As is apparent from FIG. 16, the peak of each diffraction efficiency is set around a corresponding representative wavelength.

In the third embodiment, the diffraction efficiencies corresponding to the respective optical paths are set by changing the grating heights of the diffraction optical elements 304r, 304g, and 304b. Alternatively, the diffraction efficiencies may be set by changing the refractive indices of the gratings, i.e., the materials of the diffraction optical elements 304r, 304g, and 304b, or by changing both the grating heights and materials.

In this embodiment, the design wavelength and deign order of the diffraction optical elements 304r, 304g, and 304b are 550 nm and 1st order, respectively. However, the present invention is not limited to them. When the design order is set to an order other than 1st order, the grating height or the like must be changed.

The phase functions of the diffraction optical elements 304r, 304g, and 304b inserted in the respective optical paths are the same in the third embodiment, but may be different between their phase paths.

(Fourth Embodiment)

The fourth embodiment of the present invention will be explained with reference to FIG. 23. The first to third embodiments adopt the dichroic prism (cross prism) XDP as the color combination system of the projection optical system. In the fourth embodiment, the color combination system is comprised of various mirrors instead of the dichroic prism XDP as the optical system of a projection display apparatus, and diffraction optical elements are arranged between the color combination system and image display elements corresponding to respective colors.

Figure 23:
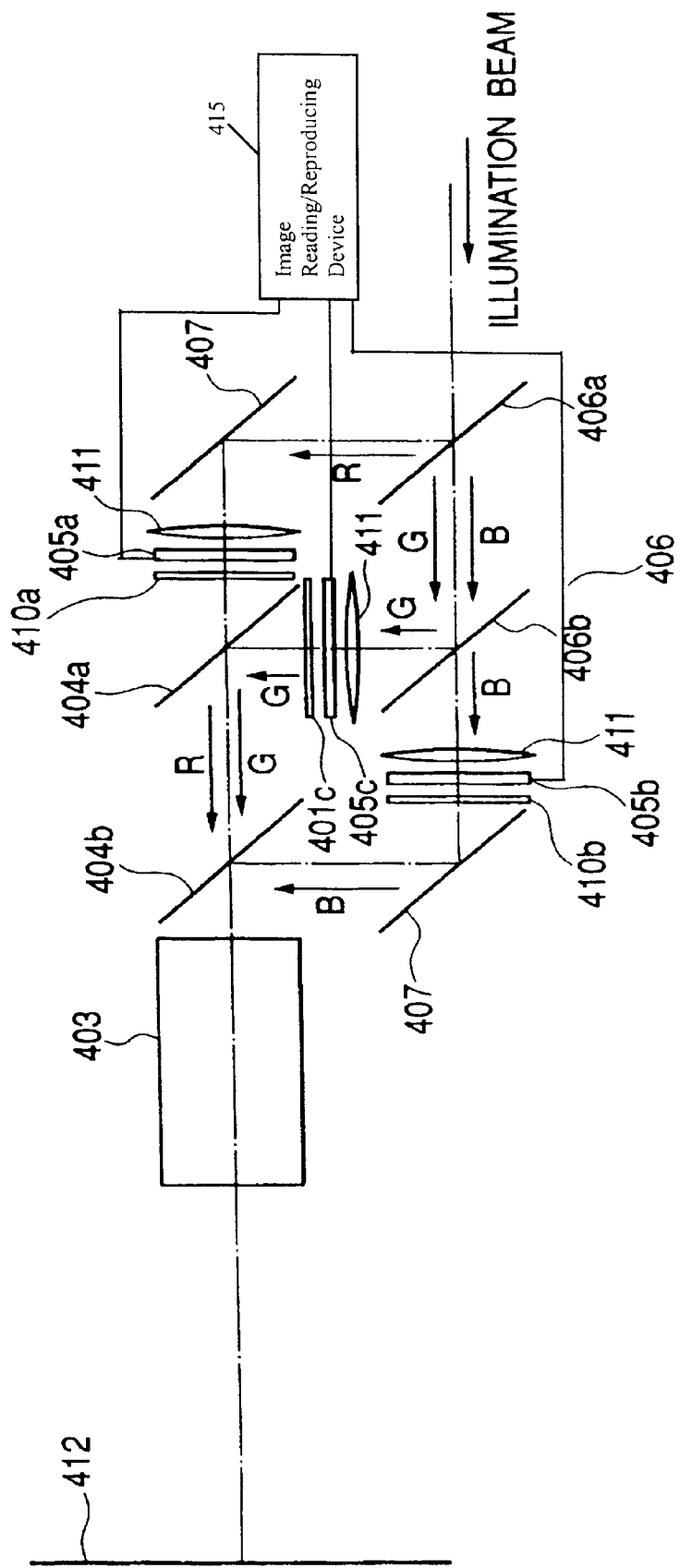
FIG. 23 is a sectional view showing an optical system in a projection display apparatus according to the fourth embodiment.
Figure 26:
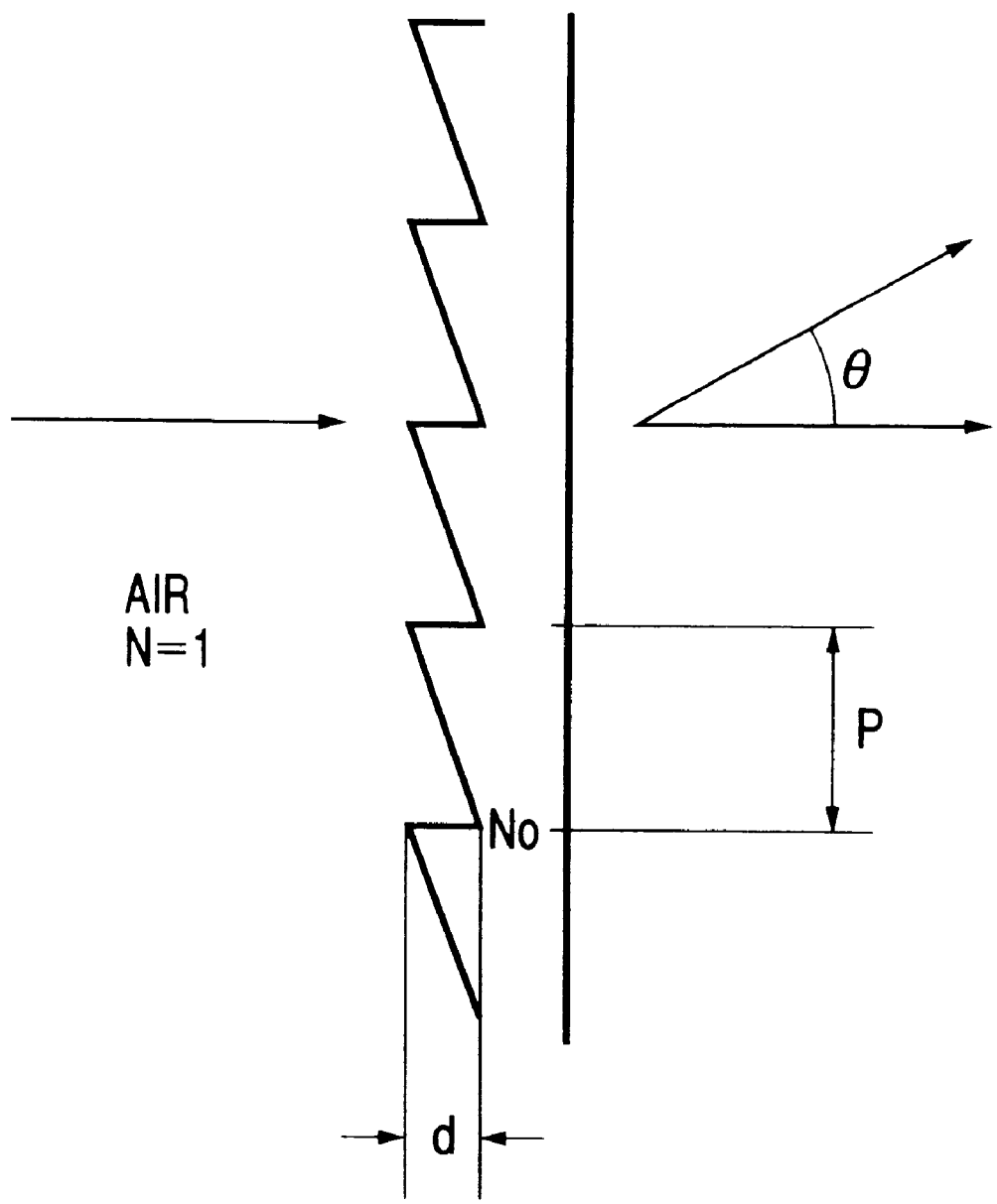
FIG. 26 is a view for explaining diffraction action of a diffraction optical element.
Figure 28:
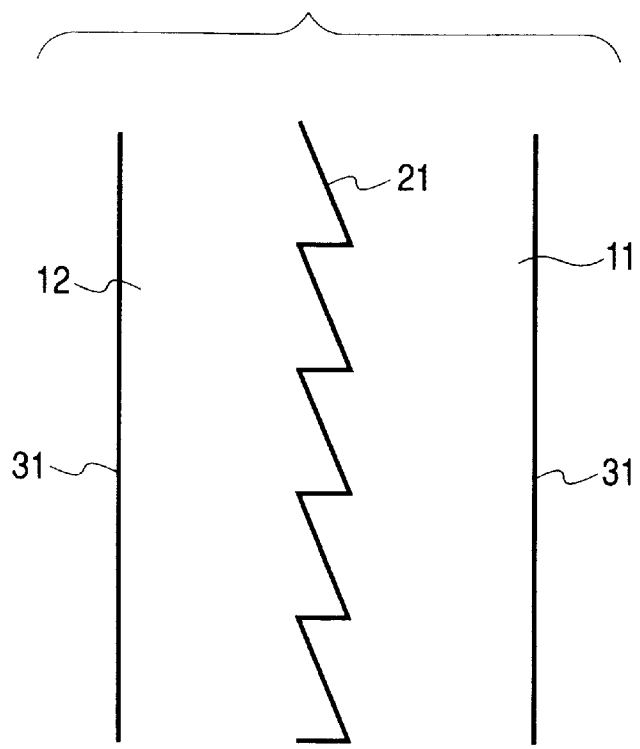
FIG. 28 is a view showing an arrangement which reduces the wavelength dependence of the diffraction efficiency in the diffraction optical element.
Figure 29:
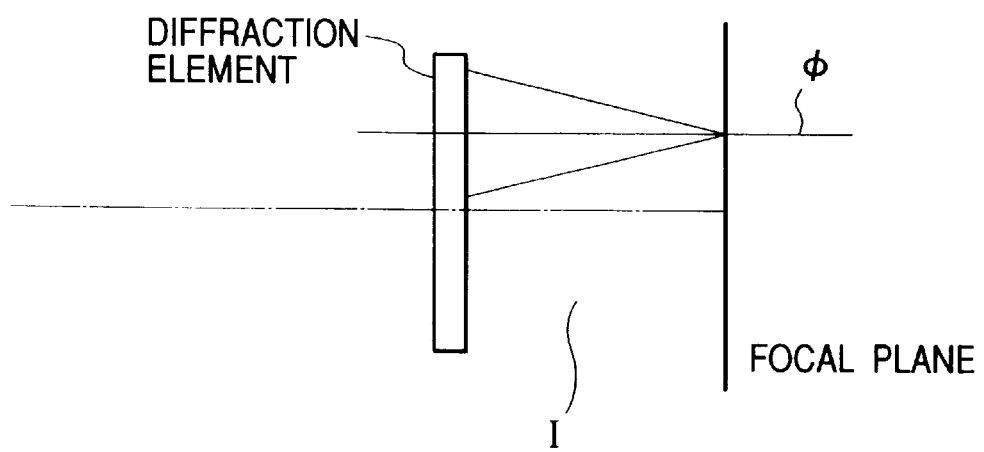
FIG. 29 is a view for explaining the grating pitch in the diffraction optical element.

As shown in FIG. 23, the fourth embodiment comprises a color separation system 406 made up of first and second dichroic mirrors 406a and 406b, a color combination system 404 made up of first and second dichroic mirrors 404a and 404b, and a projection optical system 403. Deflection means 407 and image display elements 405 (liquid crystal panels 405a to 405c) are inserted in the optical path between the color separation system 406 and the color combination system 404. Diffraction optical elements 410a, 410b, and 410c are inserted in the optical paths between the liquid crystal panels 405a, 405b, and 405c and the color combination system 404.

The diffraction optical elements 410a, 410b, and 410c have the same phase function and different wavelengths at which their diffraction efficiencies maximize, similar to the diffraction optical elements 204r, 204g, and 204b used in the second embodiment. The color separation system 406 receives, as an illumination beam, white light emitted by a light source 109a via a light source section 109 and integrator section 108 shown in FIG. 24.

In the color separation system 406, as shown in FIG. 23, when the illumination beam of white light is incident on the first dichroic mirror 406a, the first dichroic mirror 406a transmits light components with green (G) and blue (B) wavelengths, and reflects a light component with a red (R) wavelength. The light component with the red wavelength reflected by the first dichroic mirror 406a is deflected by the deflection means 407, illuminates the first liquid crystal panel 405a via a corresponding field lens 411, passes through the dichroic mirrors 404a and 404b of the color combination system 404 via the diffraction optical element 410a, and is incident on the projection optical system 403.

The light components with the green and blue wavelengths having passed through the first dichroic mirror 406a are incident on the second dichroic mirror 406b. The dichroic mirror 406b reflects the light component with the green wavelength, and transmits the light component with the blue wavelengths. The light component with the green wavelength reflected by the second dichroic mirror 406b illuminates the second liquid crystal panel 405c via a corresponding field lens 411, is reflected by the dichroic mirrors 404a of the color combination system 404 via the diffraction optical element 410c, and is incident on the projection optical system 403 through the dichroic mirror 404b. The light component with the blue wavelength having passed through the second dichroic mirror 406b illuminates the third liquid crystal panel 405b via a corresponding field lens 411, is deflected by the deflection means 407 of the color combination system 404 via the diffraction optical element 410b, is reflected by the dichroic mirror 404b and is incident on the projection optical system 403.

In the color combination system 404, the light components with the red and green wavelengths are combined by the first dichroic mirror 404a, and the combined light component is further combined with the light component with the blue wavelength by the second dichroic mirror 404b. The resultant combined light is incident on the projection optical system 403.

The optical system of the projection display apparatus having this arrangement can also obtain the same effects by interposing the diffraction optical elements between the color combination system and the image display elements.

The projection optical system is a 5-unit type zoom lens in the above embodiments. The zoom type is not limited to this, and even a single lens can realize the same effects.

The phase function is expressed by a function rotation-symmetrical about the optical axis of the lens system in the above embodiments, but is not limited to this.

In the above embodiments, the diffraction optical element is inserted on the optical path after color separation, so that the aberration correction effect can be attained even by replacing the diffraction optical element with a refractive element. However, the diffraction optical element is thin and thus can achieve a small-size, lightweight optical system.

In the first to third embodiments, the diffraction optical element is arranged near the incident surface of the dichroic prism XDP. Alternatively, the diffraction optical element can be integrated with the cross prism or the like to further downsize the optical system.

An information processing system capable of improving the display image quality and performing various processes for a display image can be constructed by connecting a terminal device such as a personal computer to the projection display apparatus of any embodiment, supplying, to the liquid display panels of the projection display apparatus, graphic images created by the terminal device, images downloaded by the terminal device, or pieces of image information of a CD-ROM or the like played back by the terminal device, and projecting and displaying these images on the screen over each other. Moreover, an image recording/reproducing system capable of improving the display image quality and performing recording, playback, special playback, and the like for a display image can be constructed by connecting an image recording/reproducing device such as a video tape recorder or DVD to the projection display apparatus of any embodiment, supplying pieces of motion or still image information output from the image recording/reproducing device 415 the liquid crystal panels of the projection display apparatus, and projecting and displaying the pieces of image information on the screen over each other.

As has been described above, the present invention can provide a projection display apparatus having a projection optical system which achieves high performance and small size and reduces parasitic-diffracted light (stray light) even with the use of a diffraction optical element having a simple arrangement, and an information processing system and image recording/reproducing system 415 using the projection display apparatus.

What is claimed is:

1. A projection display apparatus comprising:
    color separation means for separating light from a light source into a plurality of beams having different wavelength regions;
    a plurality of image display elements each inserted in each of optical paths of the beams separated by said color separation means so as to be illuminated by the beams;
    color combining means for combining the beams emerging from said plurality of image display elements; and
    projection means for projecting the beams combined by said color combining means on a projection surface,
    wherein a diffraction optical element is inserted in at least one of a plurality of optical paths between said plurality of image display elements and said color combining means.

2. An apparatus according to claim 1, wherein said diffraction optical element includes a transmission-type phase grating.

3. An apparatus according to claim 1, wherein each image display element includes a transmission-type liquid crystal element.

4. An apparatus according to claim 1, wherein a sectional shape of said diffraction optical element is a kinoform shape or a stepwise shape that has not less than eight steps and approximates the kinoform shape.

5. An apparatus according to claim 1, wherein said color separation means separate light from the light source into beams in red, green, and blue wavelength regions.

6. An apparatus according to claim 5, wherein said diffraction optical element is inserted in an optical path of the beam in the blue wavelength region.

7. An apparatus according to claim 1, wherein diffraction optical elements are inserted in at least two of the optical paths between said plurality of image display elements and said color combining means.

8. An apparatus according to claim 7, wherein said diffraction optical elements are designed to exhibit the maximum diffraction efficiency at different wavelengths.

9. An apparatus according to claim 8, wherein the diffraction optical element is inserted in each of optical paths between said plurality of image display elements and said color combining means.

10. An apparatus according to claim 9, wherein said diffraction optical elements are designed to exhibit the maximum diffraction efficiency at different wavelengths.

11. An apparatus according to claim 1, wherein said color combining means includes a dichroic prism which has at least two light incidence surfaces, and combines beams having different wavelength regions from the respective incidence surfaces to output the combined beam.

12. An apparatus according to claim 1, wherein said color combining means comprises dichroic mirrors for transmitting, reflecting, and combining the beams having the different wavelength regions.

13. An information processing system comprising:

the projection display apparatus defined in claim 1; and a computer for generating image information to be supplied to said projection display apparatus.

14. An image recording/reproducing system comprising:

the projection display apparatus defined in claim 1; and an image recording/reproducing device connected to said projection display apparatus to record and/or reproduce image information to be supplied to said projection display apparatus.

15. A projection display apparatus according to claim 1, wherein said diffraction optical element reduces chromatic aberration of magnification of said projection means.

16. An projection display apparatus comprising:

color separation means for separating light from a light source into a plurality of beams having different wavelength regions;

a plurality of image display elements each inserted in each of optical paths of the beams separated by said color separation means so as to be illuminated by the beams;

color combining means for combining the beams emerging from said plurality of image display elements; and projection means for projecting the beams combined by said color combing means on a projection surface, wherein a diffraction optical element is inserted in at least one of a plurality of optical paths between said plurality of image display elements and said color combining means, and wherein letting $\lambda c$ be a central wavelength of a wavelength region of a beam illuminating an image display element on an optical path in which said diffraction optical element is inserted, or a wavelength having the highest luminous intensity in the wavelength region, and $\lambda i$ be a wavelength having the highest diffraction efficiency of said diffraction optical element, the wavelengths $\lambda c$ and $\lambda i$ satisfy $$0.0 < ABS((\lambda i - \lambda c)/\lambda c) < 0.14$$

(where ABS( ): absolute value).

17. An information processing system comprising:

a projection display apparatus according to claim 16; and a computer for generating image information to be supplied to said projection display apparatus.

18. An image recording/reproducing system comprising:

a projection display apparatus to claim 16; and an image recording/reproducing device connected to said projection display apparatus to record and/or reproduce image information to be supplied to said projection display apparatus.

* * * * *

UNITED STATES PATENT AND TRADEMARK OFFICE
CERTIFICATE OF CORRECTION

PATENT NO. : 6,565,212 B2
DATED : May 20, 2003
INVENTOR(S) : Kobayashi et al.

It is certified that error appears in the above-identified patent and that said Letters Patent is hereby corrected as shown below:

Column 14,
Line 14, delete "system capable" and insert therefore -- system 415 capable --
Line 18, delete "device such" and insert therefore -- device 415 such --

Column 16,
Line 8, delete "combing" and insert therefore -- combining --

Signed and Sealed this

Second Day of August, 2005

JON W. DUDAS
*Director of the United States Patent and Trademark Office*